United States Patent
Nogi et al.

(10) Patent No.: US 9,096,732 B2
(45) Date of Patent: Aug. 4, 2015

(54) CONVEYANCE METHOD FOR WATER-ABSORBING RESIN POWDER SUBSTANCE

(75) Inventors: Kozo Nogi, Himeji (JP); Masatoshi Nakamura, Himeji (JP); Koji Matsumoto, Himeji (JP); Kazuma Awai, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 930 days.

(21) Appl. No.: 12/935,133

(22) PCT Filed: Mar. 26, 2009

(86) PCT No.: PCT/JP2009/056161
§ 371 (c)(1),
(2), (4) Date: Jan. 10, 2011

(87) PCT Pub. No.: WO2009/119758
PCT Pub. Date: Oct. 1, 2009

(65) Prior Publication Data
US 2011/0110730 A1    May 12, 2011

(30) Foreign Application Priority Data

Mar. 28, 2008  (JP) ................. 2008-086570
Apr. 28, 2008  (JP) ................. 2008-117167
Sep. 22, 2008  (JP) ................. 2008-242697

(51) Int. Cl.
*B65G 53/00*  (2006.01)
*C08J 3/12*  (2006.01)

(52) U.S. Cl.
CPC ............ *C08J 3/12* (2013.01); *C08J 2333/02* (2013.01)

(58) Field of Classification Search
USPC ............... 406/197, 198; 502/402; 525/330.2; 528/481
See application file for complete search history.

(56) References Cited

U.S. PATENT DOCUMENTS 4,281,946 A * 8/1981 Kanics ................. 406/95
4,900,200 A * 2/1990 Harumoto et al. .......... 406/93
(Continued)

FOREIGN PATENT DOCUMENTS

JP  B-H02-34848   5/1980
JP  64056707 A    3/1989
(Continued)

OTHER PUBLICATIONS

Supplemental European Search Report for European Application No. 09724541 dated Oct. 6, 2011, 4 pages.
(Continued)

*Primary Examiner* — Joseph Dillon, Jr.
(74) *Attorney, Agent, or Firm* — Cesari and McKenna, LLP

(57) ABSTRACT

[Problem] To provide a pneumatic conveyance method for a water-absorbing resin powder substance, which is capable of suppressing property decrease of the water-absorbing resin powder substance, while suppressing obstruction phenomenon.
[Solution] A conveyance method for a water-absorbing resin powder substance by pneumatic conveyance of the water-absorbing resin powder substance during a production step via a transportation pipeline, wherein a variation of a solid-gas ratio (R1/R2) exceeds 1 and is equal to or smaller than 7, provided that R1 (kg-resin/kg-air) stands for an initial solid-gas ratio at a start point of the transportation pipeline, and R2 (kg-resin/kg-air) stands for a terminal solid-gas ratio at a terminal point of the transportation pipeline is provided.

15 Claims, 7 Drawing Sheets

(56) References Cited

U.S. PATENT DOCUMENTS

| | | | |
|---|---|---|---|
| 6,582,161 B2* | 6/2003 | Noguki | 406/197 |
| 6,727,345 B2* | 4/2004 | Kajikawa et al. | 528/502 R |
| 6,817,557 B2* | 11/2004 | Kakita et al. | 241/23 |
| 8,360,691 B2* | 1/2013 | Moretto | 406/17 |
| 8,410,223 B2* | 4/2013 | Matsumoto et al. | 525/330.2 |
| 8,651,773 B2* | 2/2014 | Funk et al. | 406/197 |
| 8,791,230 B2* | 7/2014 | Matsumoto et al. | 528/481 |
| 2001/0046420 A1* | 11/2001 | Noguki | 406/197 |
| 2002/0187012 A1* | 12/2002 | Grasshoff | 406/95 |
| 2003/0020199 A1* | 1/2003 | Kajikawa et al. | 264/140 |
| 2007/0225160 A1* | 9/2007 | Kitano et al. | 502/402 |
| 2007/0274789 A1* | 11/2007 | DeBruin et al. | 406/197 |
| 2009/0022603 A1* | 1/2009 | Feise et al. | 417/55 |
| 2009/0060660 A1* | 3/2009 | Funk et al. | 406/197 |
| 2009/0060661 A1* | 3/2009 | Feise et al. | 406/197 |
| 2011/0028670 A1* | 2/2011 | Matsumoto et al. | 526/317.1 |
| 2011/0293380 A1* | 12/2011 | Stuke et al. | 406/22 |
| 2013/0261276 A1* | 10/2013 | Matsumoto et al. | 526/320 |

FOREIGN PATENT DOCUMENTS

| | | |
|---|---|---|
| JP | A-H05-51131 | 8/1990 |
| JP | A-S55-16874 | 2/1993 |
| JP | 6-191640 | 7/1994 |
| JP | 6-345264 | 12/1994 |
| JP | 2002212331 A | 7/2002 |
| JP | 2004345804 A | 12/2004 |
| WO | 2007/104657 | 9/2007 |
| WO | 2007/104673 | 9/2007 |
| WO | 2007/104676 | 9/2007 |

OTHER PUBLICATIONS

Tsuji, Yukata. "Fundamentals of pneumatic conveyance" Yohkendo Co., Ltd., p. 134.

* cited by examiner

CONVEYANCE METHOD FOR WATER-ABSORBING RESIN POWDER SUBSTANCE

CROSS REFERENCE TO RELATED APPLICATIONS

This application is a National Stage of International Application No. PCT/JP2009/056161, filed on Mar. 26, 2009, which claims the priority of Japanese Application No. 2008-086570 filed Mar. 28, 2008, Japanese Application No. 2008-117167 filed Apr. 28, 2008, Japanese Application No. 2008-242697 filed Sep. 22, 2008. The content of the prior application mentioned above is incorporated herein by reference in its entirety.

TECHNICAL FIELD

The present invention relates to a conveyance method for a water-absorbing resin powder substance.

BACKGROUND ART

In recent years, in hygiene products such as disposable diapers, sanitary napkins and incontinent pads, the water-absorbing resin as a composition material thereof has been widely used, in view of absorbing body liquid. As such a water-absorbing resin, for example, there have been known a cross-linked product of a partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer, or a cross-linked product thereof, and a cross-linked product of a cationic monomer and the like. This water-absorbing resin may be used after converted to also a sheet-like, fiber-like or film-like form, however, it is generally used in a water-absorbing agent after converted to a powder-like form (particulate). As such powders (particles), for example, the particulate water-absorbing agent, having a weight average particle diameter thereof of about 200 to 800 μm, is used widely.

The particulate water-absorbing agent is produced via many steps including a drying step, a crushing step, a classification step, a surface cross-linking step, and the like. In an industrial scale production, a transportation apparatus is used for conveyance between apparatuses performing each step. As a conveyance system, mechanical conveyance and pneumatic conveyance are included. In mechanical conveyance, for example, a conveyor is used as the transportation apparatus.

The pneumatic conveyance has many merits as compared with the mechanical conveyance. As merits of the pneumatic conveyance, less mechanical parts, less mechanical troubles, superiority in durability, a one way line without necessity of a return line which is different from a belt conveyer and the like, less commingling of foreign materials and the like are included.

A system of pneumatic conveyance is largely classified to low density pneumatic conveyance and high density pneumatic conveyance. In low density pneumatic conveyance, a powder substance to be conveyed is in a dispersed state in a transportation pipeline. In high density pneumatic conveyance, a powder substance to be conveyed moves inside the transportation pipeline while forming an aggregate called a slag or a plug. Because high air flow velocity is required for the powder substance to maintain a dispersed state, low density pneumatic conveyance is high-velocity conveyance. On the other hand, high density pneumatic conveyance is low-velocity conveyance.

During pneumatic conveyance, collision or friction may occur in particles themselves of a substance to be conveyed (powder substance). In addition, in pneumatic conveyance, the powder substance may collide with a pipeline. In addition, collision or friction may occur between the powder substance and the pipeline. The powder substance may be worn or broken during pneumatic conveyance. Pneumatic conveyance may give influence on property of the water-absorbing resin powder substance. Therefore, pneumatic conveyance which is capable of suppressing property decrease of the powder substance is required.

Non-Patent Document 1 discloses various pneumatic conveyance methods using secondary air. Patent Document 1 discloses a conveyance method for the water-absorbing resin powder substance containing a polyhydric alcohol, which is capable of suppressing property decrease. Patent Documents 2 and 3 disclose pneumatic conveyance methods using secondary air in combination. Patent Document 4 discloses a method for preventing deterioration of powder substance characteristics caused by particle fracture during conveyance.

In addition, other than the above Documents, conveyance methods for the water-absorbing resin powder substance have been proposed, and Patent Documents 5 to 7 disclose pneumatic conveyance methods for the water-absorbing resin powder substance, which provide suppressed property decrease during conveyance. Aiming at such an object, specifically, Patent Document 5 specifies curvature radius of a pipeline to equal to or higher than 5 times diameter of the pipeline, Patent Document 6 specifies gas speed and solid-gas ratio, and Patent Document 7 has specifies Froude number. Still more, Patent Document 8 discloses a method for preventing aggregation of the water-absorbing resin powder substance during conveyance by heating or keeping heated of an apparatus, and discloses pneumatic conveyance as one example of a conveyance method.

PRIOR ART DOCUMENTS

Patent Document 1: JP-A-2004-345804
Patent Document 2: JP-A-6-191640
Patent Document 3: JP-A-6-345264
Patent Document 4: JP-A-2004-43102
Patent Document 5: WO 2007/104657
Patent Document 6: WO 2007/104673
Patent Document 7: WO 2007/104676
Patent Document 8: U.S. Pat. No. 6,817,557
Non-Patent Document 1: "Fundamentals of pneumatic conveyance", Yutaka Tsuji, Yohkendo Co., Ltd., page 134.

DISCLOSURE OF THE INVENTION

Problem to be Solved by the Invention

As described above, Patent Documents 1 to 3 disclose pneumatic conveyance methods using secondary air in combination. Here, use of secondary air in combination significantly increases air flow amount in the transportation pipeline with proceeding of flow. As a result, in particular, when length of a pipeline is long, such phenomenon generates that a flow mode varies from high density conveyance to low density conveyance. However, in Patent Documents 1 to 3, sufficient consideration has not been taken on problems accompanying with this phenomenon. It should be noted that, although Patent Document 1 suggests suppression of property decrease, principal attention has been paid on prevention of obstruction in the transportation pipeline.

In addition, as other problem relating to pneumatic conveyance, obstruction phenomenon (clogging) is included. Generation of obstruction phenomenon stops conveyance. Frequent generation of obstruction phenomenon decreases conveyance (transportation) efficiency.

It is an object of the present invention to provide a pneumatic conveyance method for the water-absorbing resin powder substance, which is capable of suppressing property decrease of the water-absorbing resin powder substance, while suppressing obstruction phenomenon.

Means for Solving the Problem

The present inventors have found a novel conveyance method which is capable of suppressing property decrease in pneumatic conveyance, based on a technical idea different from a conventional one. In addition, according to the present invention, it has been clarified that obstruction phenomenon can be suppressed, while suppressing property decrease.

The conveyance method of the present invention is a conveyance method by pneumatic conveyance of the water-absorbing resin powder substance during a production step via a transportation pipeline. In this conveyance method, a variation of solid-gas ratio (R1/R2) exceeds 1 and is equal to or smaller than 7, provided that R1 (kg-resin/kg-air) stands for an initial solid-gas ratio at the start point of the transportation pipeline, and R2 (kg-resin/kg-air) stands for a terminal solid-gas ratio at the terminal point of the transportation pipeline.

Preferably, the initial solid-gas ratio R1 is set at 35 to 150 (kg-resin/kg-air).

Preferably, the terminal solid-gas ratio R2 is set at 20 to 50 (kg-resin/kg-air).

Preferably, a linear velocity of the water-absorbing resin powder substance at the start point of the transportation pipeline (initial linear velocity) is set at equal to or lower than 7 m/s.

Preferably, at least a part of the transportation pipeline is kept heated at a temperature equal to or higher than 50° C. by heating from outside. Preferably, a production apparatus performing the production step includes a storage part, and the storage part is kept heated at a temperature equal to or higher than 50° C. by heating from outside. A typical example of the storage part is a hopper.

Preferably, the pneumatic conveyance is high density pneumatic conveyance. Preferably, in this conveyance method, total length Lt of the transportation pipeline included in one transportation section is equal to or longer than 50 m. Preferably, amount of the conveyed water-absorbing resin powder substance is equal to or higher than 1000 kg/hr.

Preferably, the water-absorbing resin powder substance is surface cross-linked with a polyhydric alcohol. Preferably, the water-absorbing resin powder substance comprises a water-soluble polyvalent metal salt. Preferably, the water-absorbing resin powder substance comprises an inorganic particle.

Preferably, saline flow conductivity (SFC), for 0.69% by mass normal saline solution, of the water-absorbing resin powder substance after conveyance is equal to or higher than 10 ($10^{-7} \cdot cm^3 \cdot s \cdot g^{-1}$). It should be noted that, the "water-absorbing resin powder substance after conveyance" means the water-absorbing resin powder substance just after conveyance of the present invention was performed, and when conveyance of the present invention is performed at an intermediate stage of the production steps of the water-absorbing resin powder substance, it means the water-absorbing resin powder substance just after the conveyance at this intermediate stage was performed (an intermediate product). It is shown that the conveyance method of the present invention suppresses damage of the water-absorbing resin powder substance, by specifying property after conveyance.

Preferably, the water-absorbing resin powder substance is a polyacrylic acid (salt)-based water-absorbing resin with an irregular and fractured shape, obtained by continuous belt polymerization or continuous kneader polymerization.

Preferably, the water-absorbing resin powder substance is a polyacrylic acid (salt)-based water-absorbing resin obtained by a production step including a fine-powder recycling step.

Preferably, the water-absorbing resin powder substance is a polyacrylic acid (salt)-based water-absorbing resin formed by being surface cross-linked at 150 to 250° C.

Effects of the Invention

According to the present invention, the initial linear velocity can be suppressed, as well as obstruction phenomenon can be suppressed, by suitably setting a variation of a solid-gas ratio. Thus, as a result of controlling the initial linear velocity at small value, property decrease of the water-absorbing resin powder substance can be suppressed. It should be noted that, such action effect is exerted significantly, in particular, when transportation distance Lt is large. In addition, such effect appears significantly, in particular, for the water-absorbing resin obtained in the specific production step (polymerization, surface cross-linking, additives, fine-powder recycling or the like).

BRIEF DESCRIPTION OF THE DRAWINGS

FIG. 5 is shown in detail some amount.

MODE FOR CARRYING OUT THE INVENTION

Figure 1:
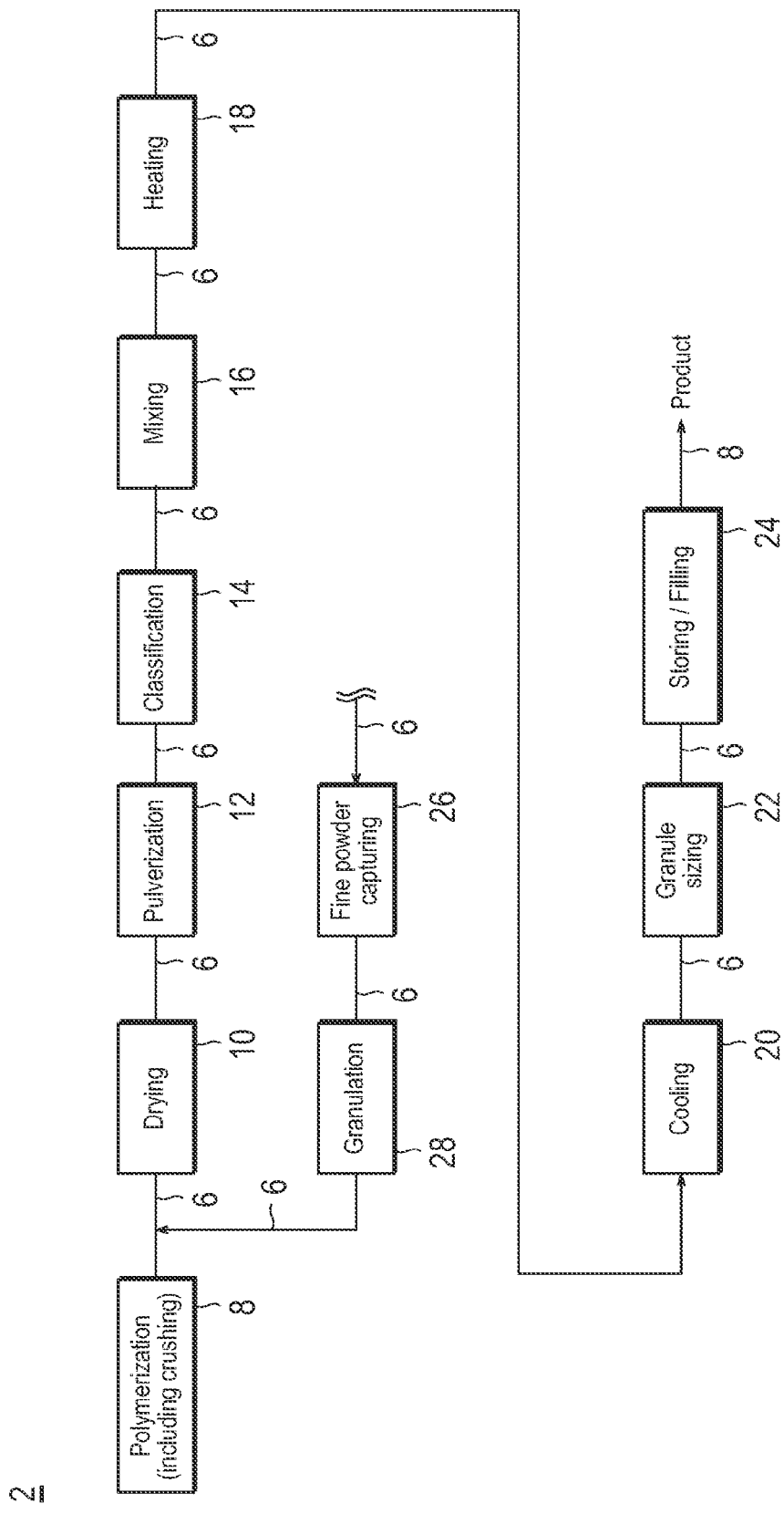
FIG. 1 is a schematic configuration showing a production apparatus to be used in producing the water-absorbing resin (other name; a particulate water-absorbing agent).

The present invention relates to the conveyance method for the water-absorbing resin powder substance in the production step of the particulate water-absorbing agent. In this specification, the "water-absorbing resin" means a water swelling and water insoluble polymer gelling agent. Absorbency (CRC) is essentially equal to or higher than 5 g/g, preferably 10 to 100 g/g, and further preferably 20 to 80 g/g. In addition, soluble components (extractables) are essentially 0 to 50% by weight, preferably 0 to 30% by weight, further preferably 0 to 20% by weight, and particularly preferably 0 to 10% by weight.

It should be noted that, the water-absorbing resin is not limited to a form where whole amount (100%) is a polymer, and may include additives and the like (to be described later), in a range to maintain the performance described above. That is, even for the particulate water-absorbing agent (a water-absorbing resin composition), it is called generally the water-absorbing resin in the present invention. In the present invention, when the water-absorbing resin is the particulate water-absorbing agent (the water-absorbing resin composition), content of the water-absorbing resin (a polyacrylic acid (salt)-based water-absorbing resin) relevant to the present invention is preferably 70 to 99.9% by weight, more preferably 80 to 99.7% by weight, and still more preferably 90 to 99.5% by weight, relative to total amount. As components other than the water-absorbing resin, in view of water absorbing speed or impact resistance of the powders (particles), water is preferable, and the additives to be described later are contained as needed.

In this specification, "polyacrylic acid (salt)" means a polymer having acrylic acid (salt) as a principal component, as a repeating unit. Specifically, it contains acrylic acid (salt) essentially in 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, and is preferably a monovalent salt, and further preferably an alkali metal salt or an ammonium salt, particularly preferably the alkali metal salt, and further a sodium salt.

"EDANA" is an abbreviation of European Disposables and Nonwovens Association. As for detail of the measurement method (ERT/EDANA Recommended Test Methods) for the water-absorbing resin of an European standard (nearly a world standard), refer to the ERT original, which is known document (revised in 2002).

In this specification, a "water-containing gel-like polymer (water-containing gel)", a "dried substance" and the "water-absorbing resin powder substance (a powder substance)" are defined as follows.

The "water-containing gel-like polymer (water-containing gel; polymer gel)" indicates a water-containing gel-like cross-linked polymer of the water-absorbing resin. As a representative, it means water-containing gel obtained in a polymerization step. Usually it indicates a polymer having a moisture content of equal to or higher than 30% by weight.

The "dried substance" indicates a dried polymer of the water-absorbing resin after being subjected to a drying step. It usually indicates a dried polymer having a moisture content in the drying step of less than 30% by weight, and preferably less than 20% by weight, although it depends on the moisture content after polymerization. Shape thereof is not limited and drying may be performed at the same time as polymerization (drying by polymerization heat or by heat applied during polymerization or the like).

"The water-absorbing resin powder substance (a powder substance)" means a solid having a certain fluidity as powders, for example, it means the state in which Flow Rate (ERT450.2-02) can be measured as fluidity, or a solid which can be sieve classified by (ERT420.2-02). More specifically, it indicates a solid of a particle diameter of equal to or smaller than 5 mm, specified by sieve classification, which is powder substance of dried polymer of the water-absorbing resin, or powder substance to be used as a solid as it is among raw materials or the additives of the water-absorbing resin (for example, water-insoluble inorganic powders, polyvalent metal salt powders or hydrate salts thereof and the like). Moisture content is not limited as long as it is a solid, however, it is usually below 30% by weight, and still more equal to or lower than 20% by weight. The lower limit of particle diameter is not especially limited, however, for example, equal to or larger than 1 nm. It should be noted that, in general, there may be the case where those of equal to or larger than 1 mm are called particles, and those of below 1 mm are called powder substances, however, in the present invention, they are called generally powder particle substances (the water-absorbing resin or raw materials thereof), and hereafter referred to as "a powder substance". In addition, in the present specification, "the powder substance" and "powder" are treated as synonyms.

Firstly, explanation will be given briefly on the production step of the particulate water-absorbing agent (water-absorbing resin powder substance) relevant to the present invention, and next explanation will be given on the conveyance method of the present invention.

FIG. 1 is a schematic diagram showing a production facility 2 to be used to produce the water-absorbing resin (the particulate water-absorbing agent). In this production facility 2, apparatuses for performing each step are connected by a transportation part 6. A polymerization apparatus 8, a drying apparatus 10, a pulverization apparatus 12, a classification apparatus 14, a mixing apparatus 16, a heating apparatus 18, a cooling apparatus 20, a granule sizing apparatus 22, a filling apparatus 24, a fine powder capturing apparatus 26, and a granulation apparatus 28 are installed in this production facility 2. The water-absorbing resin powder substance obtained in a certain step is transported to the next step by the transportation part 6.

The polymerization step is performed using the polymerization apparatus 8. The drying step is performed using the drying apparatus 10. The pulverization step is performed using the pulverization apparatus 12. The classification step is performed using the classification apparatus 14. The surface cross-linking step is performed using the mixing apparatus 16 and the heating apparatus 18. The cooling step is performed using the cooling apparatus 20. The granule sizing step is performed using the granule sizing apparatus 22. The packaging step is performed using the filling apparatus 24. The fine powders are collected using the fine powder capturing apparatus 26. The granulation step is performed using the granulation apparatus 28. The fine powders collected, or granulated particles granulated in the granulation step are recycled by a fine-powder recycling step.

[Polymerization Step]

The polymerization step is the step for polymerizing a monomer, which can form the water-absorbing resin by polymerization, to generate a polymer gel (a water-containing gel-like polymer). A polymerization method of the water-absorbing resin of the present invention is not especially limited, for example, bulk polymerization, precipitation polymerization, aqueous solution polymerization, reversed phase suspension polymerization, spraying polymerization, liquid droplet polymerization, or the like is included. In view of performance and easiness of polymerization control, aqueous solution polymerization and reversed phase suspension polymerization in which the monomer is used as an aqueous solution are preferable.

In the present invention, aqueous solution polymerization, in particular, continuous aqueous solution polymerization is preferable, which is significant in solving a problem of carrying property, owing to shape of the resultant polymer gel. In continuous aqueous solution polymerization, in view of more exerting effect of the present invention, continuous belt polymerization or continuous kneader polymerization may be used suitably. As preferable continuous polymerization, continuous kneader polymerization (for example, U.S. Pat. No. 6,987,151 specification, U.S. Pat. No. 6,710,141 specification) and continuous belt polymerization (for example, U.S. Pat. No. 4,893,999, U.S. Pat. No. 6,241,928, US-A-2005-215734) are included. In such continuous polymerization, the water-absorbing resin (in particular, an irregular shaped, fractured water-absorbing resin) can be produced in high productivity, however, it tends to provide variation of or decrease in property accompanying with scale-up, but the present invention is capable of solving also such a problem.

(Monomer)

The monomer is not especially limited, however, for example, a water-soluble unsaturated monomer shown below is included: for example, an anionic unsaturated monomer such as (meth)acrylic acid, (maleic anhydride) or maleic acid, itaconic acid, cynamiic acid, vinyl sulfonic acid, allyltoluene sulfonic acid, vinyltoluene sulfonic acid, styrene sulfonic acid, 2-(meth)acrylamido-2-methylpropane sulfonic acid, 2-(meth)acryloylethane sulfonic acid, 2-(meth)acryloylpropane sulfonic acid, 2-hydroxyethyl (meth)acryloyl phosphate and a salt thereof; a mercapto group-containing unsaturated monomer; a phenolic hydroxyl group-containing unsaturated monomer; an amide group-containing unsaturated monomer such as (meth)acrylamide, N-ethyl(meth)acrylamide, N,N-dimethyl (meth)acrylamide; an amino group-containing unsaturated monomer such as N,N-dimethylaminoethyl (meth)acrylate, N,N-dimethylaminopropyl (meth)acrylate, N,N-dimethylaminopropyl (meth)acrylamide. These monomers may be used alone or two or more kinds may be used in combination as appropriate. These monomers may contain a polymerization inhibitor or an iron component in an amount of equal to or lower than 5 ppm (preferably equal to or lower than 1 ppm), and preferable use amount is, for example, methoxy phenols of equal to or lower than 160 ppm by weight, which is the use amount exemplified in U.S. Pat. No. 7,049,366 specification.

Among them, in view of performance and cost of the resulting water-absorbing resin, a polyacrylic acid (salt)-based water-absorbing resin using an anionic unsaturated monomer, in particular, a carboxyl group-containing unsaturated monomer, and still more acrylic acid and/or a salt thereof (for example, a salt of sodium, lithium, potassium, ammonium, amines or the like, and among these the sodium salt is preferable in view of cost) as a principal component is preferable. Use amount of acrylic acid and/or the salt thereof is preferably equal to or more than 70% by mole, more preferably equal to or more than 80% by mole, further preferably equal to or more than 90% by mole, and particularly preferably equal to or more than 95% by mole (the upper limit is 100% by mole), relative to total monomer components (excluding an internal cross-linking agent to be described later). It should be noted that, when the monomer is an acid group-containing monomer such as a carboxyl group-containing monomer, neutralization rate thereof is not especially limited, and the polymer gel may be neutralized after polymerization, as needed. In applications where there may be contact to a human body, such as hygiene goods, neutralization after polymerization is not necessary. This neutralization rate is preferably from 40% by mole to 90% by mole, and more preferably from 50% by mole to 80% by mole.

When the above-described monomer is used as an aqueous solution in the polymerization step, concentration of the monomer in the aqueous solution (hereafter also referred to as "monomer solution") is not especially limited, however, preferably within a range of 10 to 70% by weight, more preferably within a range of 20 to 60% by weight, and further preferably 35 to 60% by weight. In addition, when the aqueous solution polymerization or the reversed phase suspension polymerization is performed, a solvent other than water may be used in combination, as needed. It should be noted that, kinds of the solvent to be used in combination is not especially limited.

(Polymerization Initiator)

In the polymerization step, for example, a radical polymerization initiator may be used. This radical polymerization initiator is not especially limited, and one or more kinds may be selected and used among those utilized in polymerization of the usual water-absorbing resin, depending on kinds of the monomer to be polymerized, polymerization conditions and the like. For example, a thermal decomposition-type initiator (for example, a persulfate such as sodium persulfate, potassium persulfate, ammonium persulfate; a peroxide such as hydrogen peroxide, t-butylperoxide, methyl ethyl ketone peroxide; an azo compound such as an azonitrile compound, an azoamidine compound, a cyclic azoamidine compound, an azoamide compound, an alkylazo compound, 2,2'-azobis(2-amidinopropane)dihydrochloride, 2,2'-azobis[2-(2-imidazoline-2-yl) propane]dihydrochloride; and the like), or a photo-decomposition-type initiator (for example, a benzoin derivative, a benzyl derivative, an acetophenone derivative, a benzophenone derivative, an azo compound or the like); and the like may be included. Among these, in view of cost and capability of reducing residual monomer, the thermal decomposition-type initiator is preferable, and a persulfate is particularly preferable. In addition, because combined use of a reducing agent can promote decomposition of these radical polymerization initiators, it is possible to make a redox-type initiator by combining both. The reducing agent above is not especially limited, however, for example, (hydrogen) sulfurous acid (salt) such as sodium sulfite and sodium hydrogen sulfite, L-ascorbic acid (salt), a reductive metal (salt) such as ferrous salt or the like; amines or the like is included.

Use amount of the radical polymerization initiator to be used in the above-described polymerization step is not especially limited, however, in view of residual monomers or water-soluble components, usually 0.001 to 2% by weight is preferable, 0.01 to 1% by weight is more preferable, 0.01 to 0.5% by weight is further more preferable, and 0.01 to 0.05% by weight is particularly preferable relative to use amount of the monomer. The use amount of the radical polymerization initiator of below 0.001% by weight relative to use amount of the monomer increases unreacted monomer, increases amount of residual monomers in the resultant water-absorbing resin, and is thus not preferable. On the other hand, the use amount higher than 2% by weight increases water-soluble components in the resultant water-absorbing resin, and is thus not preferable. It should be noted that, in this polymerization step, instead of the above-described radical polymerization initiator, the monomer may be polymerized by irradiation of activated energy rays such as radiation rays, electron beams, UV rays and the like.

(Internal Cross-Linking Agent)

In the polymerization step, the internal cross-linking agent may be used, as needed. As the internal cross-linking agent, a conventionally known internal cross-linking agent, having two or more polymerizable unsaturated groups or two or more reactive groups, in one molecule, is included. Specifically, for example, N,N'-methylenebis(meth)acrylamide, (poly)ethyleneglycol di(meth)acrylate, (poly) propyleneglycol di(meth)acrylate, trimethylolpropane tri(meth)acrylate, glycerin tri(meth)acrylate, glycerin acrylate methacrylate, ethylene oxide modified trimethylolpropanetri(meth)acrylate, pentaerythritolhexa(meth)acrylate, triallylcyanurate, triallylisocyanurate, triallylphophate, triallylamine, polyallyoxyalkane, (poly)ethyleneglycoldiglycidylether, gleceroldiglycidylether, ethyleneglycol, polyethyleneglycol, propyleneglycol, glycerin, 1,4-butanediol, pentaerythritol, ethylenediamine, ethylenecarbonate, propylenecarbonate, polyethyleneimine, glycidyl(meth)acrylate or the like is include. Among these, in consideration of reactivity, one or more kinds may be used. In particular, as the internal cross-linking agent, a compound having two or more polymerizable unsaturated groups is preferable. Use amount of the internal cross-linking agent may be determined as appropriate by desired property of the water-absorbing resin, however, usually use amount of the internal cross-linking agent is preferably in a range of 0.001 to 5% by mole, still more 0.005 to 2% by mole and particularly 0.001 to 0.5% by mole relative to the monomer. Too low use amount of the internal cross-linking agent tends to decrease strength of the polymer gel and increase soluble component, on the contrary, excessive use amount tends to decrease properties such as absorbency. It should be noted that, the internal cross-linking agent may be added to a reaction system once as a whole, or may be added dividedly.

[Drying Step]

The drying step is the step for drying the polymer gel (water-containing gel-like polymer) obtained in the above-described polymerization step. The polymer gel obtained in the polymerization step using aqueous solution polymerization is preferably supplied to the drying step, usually in a particulate state of about 0.1 to 5 mm, more preferably 0.5 to 3 mm, by crushing treatment during or after polymerization. Because surface area of the gel increases by making particulate gel, the above-described drying step can proceed smoothly. The crushing means is not especially limited, however, for example, various cutting means such as a meat chopper, a roller-type cutter, a guillotine cutter, a slicer, a roll cutter, a shredder, scissors, may be used alone or in combination as appropriate. A drying method in the drying step is not especially limited, however, as the drying apparatus 10, a method for using a usual dryer or a heating furnace may be adopted widely. Specifically, a conductive heat transfer-type dryer, a radiation heat transfer-type dryer, a hot air heat transfer-type dryer, an inductive heating dryer, or the like is exemplified. In view of speed of drying, the hot air heat transfer-type dryer (hereafter, referred to as a hot air dryer) is preferable. As this hot air dryer, a drying apparatus such as a through-flow band-type, a through-flow circuit-type, a through-flow vertical-type, a parallel flow band-type, a through-flow tunnel-type, a through-flow groove-type stirring-type, a fluidized bed-type, an air flow-type, a spray-type is included. In view of easiness of property control of the particulate water-absorbing agent, the band-type is preferable. As drying temperature, setting at relatively high temperature is preferable, specifically, preferably 100 to 250° C., more preferably 120 to 220° C., and further preferably 150 to 200° C. Drying time is not especially limited, however, it may be set at the time so as to attain desirable solid content rate of the resultant dried substance. It is preferable that solid content rate of the dried substance obtained in the drying step (specified as reduced amount by drying, obtained by drying at 180° C. for 3 hours) is equal to or higher than 90% by weight, in view of easiness of pulverization. In general, in view of production efficiency, it is preferable that the drying time is usually within two hours, although it depends on particle diameter of the polymer gel, drying temperature, air volume or the like.

[Pulverization Step]

The pulverization step is the step for pulverizing the particulate water-absorbing resin, as a dried substance of the polymer gel obtained in the polymerization step described above. This pulverization is usually performed for this dried substance, however, it may be performed for the polymer gel obtained in the polymerization step before drying. By this pulverization, the particulate water-absorbing resin, as a pulverized substance, can be obtained.

Pulverization is preferably performed so that the particulate water-absorbing resin with desired particle diameter (preferably, a weight average particle diameter of 200 to 800 μm) can be obtained as many as possible. A method for pulverization is not especially limited, and a conventionally known method can be adopted. As the pulverization apparatus 12 to be used in this pulverization step, a three-stage roll mill is exemplified. Because of generation of the fine powders by this pulverization, the fine powders are included in the particulate water-absorbing resin obtained in the pulverization step. It should be noted that, when particle diameter of the particulate water-absorbing resin obtained in the polymerization step or in the drying step is controlled in size and sufficiently small, it is not necessary to perform this pulverization step.

The particles of water-absorbing resin or water-absorbing agent obtained by the pulverization step are irregular and fractured shaped particles, and such a shape is preferable due to large specific surface area provided by crushing, and ease of fixing to pulp as well. That is, it is preferable that shape of the water-absorbing resin or the water-absorbing agent is irregular and fractured shaped particles. In addition, irregular shaped crushed fractured particles have been difficult in transportation caused by shape thereof, and have often generated property decrease accompanying with transportation, however, in the present invention, they are preferable because such problems are solved.

[Classification Step]

The classification step is the step for sieving the particulate water-absorbing resin with a sieve. In this classification step, pulverized substances obtained in the above-described pulverization step are sieved. In this classification step, for example, the classification apparatus 14 having a metal sieve mesh is used. In the classification step, by selecting particles having desired particle diameter (preferably, a weight average particle diameter (D50), specified by sieve classification, of 200 to 800 μm, and more preferably, 300 to 600 μm), using this classification apparatus 14, the objective particulate water-absorbing resin can be obtained. A classification method is not especially limited and a conventionally known method can be adopted. It should be noted that, when particle diameter of the particulate water-absorbing resin obtained in the polymerization step or in the drying step is controlled in size and sufficiently small, it is not necessary to perform this classification step. Among these, in particular, sieve classification may be applied suitably and number of sieves is determined as appropriate, however, usually it is about 2 to 5 stages.

[Surface Cross-Linking Step]

The surface cross-linking step is a step for cross-linking the neighborhood of the surface of the particulate water-absorbing resin obtained in the above-described classification step, using a surface cross-linking agent to obtain the particulate water-absorbing agent. The particulate water-absorbing resin is a water swelling cross-linked polymer, and has a cross-linked structure inside (of the particles), however, it is preferable that the water-absorbing resin (particles) used in the present invention is further cross-linked, and cross-link density of the surface thereof or the neighborhood of the surface is increased as compared with that of the inside. It should be noted that, "the neighborhood of the surface" usually indicates a part of the surface layer of the water-absorbing resin which is a part with a thickness of equal to or less than several tens μm or of equal to or less than 1/10 of total thickness, however, it can be determined as appropriate depending on objectives. In such surface cross-linking of the water-absorbing resin, (1) the surface may be cross-linked with an organic surface cross-linking agent and/or a water-soluble inorganic surface cross-linking agent, exemplified as a surface cross-linking agent to be described later, (2) a cross-linkable monomer may be subjected to cross-linking polymerization at the surface (for example, as disclosed in U.S. Pat. No. 7,201,941), or (3) the radical surface cross-linked with a persulfate or the like may be carried out (for example, as disclosed in U.S. Pat. No. 4,783,510). In addition, it is preferable that the cross-linking reaction is promoted by heating or radiation rays (preferably UV rays as disclosed in EP No. 1824910). By surface cross-linking of the neighborhood of the surface of the water-absorbing resin contained in the water-absorbing agent, AAP, in other words, absorbing capability against pressure can be increased.

In more detail, "surface cross-linking" in this application means that a region of the surface or the neighborhood of the surface of the water-absorbing resin is surface cross-linked by chemical or physical modification. For example, in the case of partially neutralized cross-linked polyacrylic acid, as an example, chemical modification includes a state that the surface cross-linking is performed with the organic surface cross-linking agent having two or more functional groups capable of reaction with a functional group, in particular, a carboxyl group, present at the neighborhood of the surface of the particles. As the organic surface cross-linking agent having two or more functional groups capable of reaction with a carbonyl group, for example, a polyvalent alcohol, a polyvalent glycidyl compound, a polyvalent amine or the like is included. In addition, the surface cross-linking in this application also includes the surface cross-linking in a form of an ionic bonding state of a polyvalent metal such as trivalent aluminum with a carboxyl group on the surface. The bonding form in the surface cross-linking is not especially limited.

Explanation will be given below on a method for performing surface cross-linking, using a surface cross-linking agent as a preferable cross-linking method. As the surface cross-linking agent to be used in the surface cross-linking step, a conventionally known surface cross-linking agent may be used suitably. For example, there is included a polyhydric alcohol such as ethyleneglycol, diethyleneglycol, propyleneglycol, triethyleneglycol, tetraethyleneglycol, polyethyleneglycol, 1,3-propanediol, dipropyleneglycol, 2,2,4-trimethyl-1,3-pentanediol, polypropyleneglycol, glycerin, polyglycerin, 2-butene-1,4-diol, 1,4-butanediol, 1,5-pentanediol, 1,6-hexanediol, 1,2-cyclohexanedimethanol, 1,2-cyclohexanediol, trimethylolpropane, diethanolamine, triethanolamine, polyoxypropylene, an oxyethylene-oxypropylene block copolymer, pentaerythritol, sorbitol or the like; an epoxy compound such as ethyleneglycol diglycidylether, polyethyleneglycol diglycidylether, glycerol polyglycidylether, diglycerolpolyglycidylether, polyglycerolpolyglycidylether, propyleneglycol diglycidylether, polypropyleneglycol diglycidylether, glycidol or the like; a polyvalent amine compound such as ethylenediamine, diethylenetriamine, triethylenetetramine, tetraethylenepentamine, pentaethylenehexamine, polyethyleneimine or the like or an inorganic salt or an organic salt (an aziridinium salt or the like) thereof; a polyvalent isocyanate compound such as 2,4-tolylenediisocyanate, hexamethylenediisocyanate or the like; a polyvalent oxazoline compound such as 1,2-ethylene-bis-oxazoline or the like; an alkylene carbonate compound such as 1,3-dioxolane-2-one, 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, 1,3-dioxopane-2-one or the like; a haloepoxy compound such as epichlorohydrin, epibromohydrin, α-methylepichlorohydrin or the like; a polyvalent metal compound such as a hydroxide or chloride of zinc, calcium, magnesium, aluminum, iron, zirconium or the like; an oxazolidinone compound such as 2-oxazolidinone (exemplified in U.S. Pat. No. 6,559,239 specification); an oxetane compound; a cyclic urea compound; or the like. Among these surface cross-linking agents, in view of property, at least one compound selected from the group consisting of a polyhydric alcohol, an epoxy compound, a polyvalent amine compound and a salt thereof, an alkylene carbonate compound, and an oxazolidinone compound is suitable. Further, a cross-linking agent having dehydration esterification reactivity selected from a polyhydric alcohol, an alkylene carbonate compound, and an oxazolidinone compound are more preferable, and in particular, a polyhydric alcohol is suitable. These surface cross-linking agents may be used alone or, in consideration of reactivity, two or more kinds may be used by mixing. It should be noted that, the surface cross-linking step may be performed two or more times in consideration of effect thereof, and in that case, as the surface cross-linking agent to be used in including and subsequent to the second time, the same surface cross-linking agent as that used in the first time may be used, or the surface cross-linking agent different from that used in the first time may be used. It should be noted that the surface cross-linking agent having dehydration esterification reactivity provides the powder substance with low moisture content, accompanying with dehydration esterification, and tends to generate a problem of property decrease caused by damage during conveyance, however, such a problem is solved in the present invention.

The water-absorbing resin powder substance relevant to the present invention is preferably surface cross-linked, and it is preferable to be surface cross-linked with the polyhydric alcohol described above. Because the present invention is capable of suppressing terminal linear velocity Vy, peeling caused by mutual friction of surface cross-linked layers is suppressed. Therefore, property enhancement effect caused by surface cross-linking with the polyhydric alcohol is difficult to be impaired. It should be noted that as the polyhydric alcohol, one kind or two or more kinds of the polyhydric alcohol of preferably C2 to C10, more preferably C3 to C8, and particularly preferably C3 to C6 is used.

In the surface cross-linking step, use amount of the above-described surface cross-linking agent depends on the surface cross-linking agent selected or a combination of the surface cross-linking agents, however, use amount from 0.001 part by weight to 10 parts by weight is preferable, and from 0.01 part by weight to 5 parts by weight is more preferable, relative to 100 parts by weight of solid content of the water-absorbing resin. By using the surface cross-linking agent in this range, it is possible to make cross-link density of the neighborhood of the surface of the water-absorbing resin higher than that of the inside. The case where the use amount of the surface cross-linking agent exceeds 10 parts by weight is not only uneconomical but also leads to excessive supply of the cross-linking agent for forming an optimal cross-linked structure for the water-absorbing resin, and is thus not preferable. The case where the use amount of the surface cross-linking agent is below 0.001 part by weight does not provide sufficient improvement effect in enhancing performance of absorbency against pressure or the like of the particulate water-absorbing agent, and is thus not preferable.

In the surface cross-linking step, in addition to the surface cross-linking agent, an organic acid (lactic acid, citric acid, p-toluenesulfonic acid) or a salt thereof, an acid substance of an inorganic acid (phosphoric acid, sulfuric acid, sulfurous acid) or a salt thereof, a basic substance such as sodium hydroxide or sodium carbonate or the like, or a polyvalent metal salt such as aluminum sulfate or the like to be described later, may be used further in combination as required, in over 0% by weight and equal to or lower than 10% by weight, further preferably over 0% by weight and equal to or lower than 5% by weight, and particularly preferably over 0% by weight and equal to or lower s than 1% by weight, relative to the water-absorbing resin.

In the surface cross-linking step, it is preferable to use water as a solvent in mixing the particulate water-absorbing resin and the surface cross-linking agent. Use amount of water depends on kind of the water-absorbing resin, particle diameter and moisture content of the particulate water-absorbing resin or the like, however, use amount over 0 part by mass and equal to or lower than 20 parts by mass is preferable, and use amount within a range of 0.5 to 10 parts by mass is more preferable, relative to 100 parts by mass of solid content of the particulate water-absorbing resin. In mixing the particulate water-absorbing resin and the surface cross-linking agent, a hydrophilic organic solvent may be used in combination, as needed. In this case, as the hydrophilic organic solvent to be used in combination, for example, lower alcohols such as methylalcohol, ethylalcohol, n-propylalcohol, isopropylalcohol, n-butylalcohol, isobutylalcohol, t-butylalcohol; ketones such as acetone; ethers such as dioxane, tetrahydrofuran; amides such as N,N-dimethylformamide; sulfoxides such as dimethylsulfoxide; or the like is included. Use amount of the hydrophilic organic solvent depends on kind of the water-absorbing resin, particle diameter and moisture content of the particulate water-absorbing resin or the like, however, use amount within a range of 0 part by mass to 20 parts by mass is preferable, and use amount within a range of 0 part by mass to 10 parts by mass is more preferable, relative to 100 parts by mass of solid content of the particulate water-absorbing resin.

In performing surface cross-linking, firstly, a surface treatment agent solution is prepared by mixing water and/or a hydrophilic organic solvent and the surface cross-linking agent in advance. Then, it is a preferable mixing method that this solution is sprayed with a sprayer or the like or dropped to the particulate water-absorbing resin, and a method for mixing by spraying is more preferable. Size of a droplet sprayed is preferably within a range of 0.1 to 300 μm, and more preferably within a range of 0.1 to 200 μm, as an average particle diameter.

The particulate water-absorbing resin, the surface cross-linking agent described above, water and the hydrophilic organic solvent are mixed using the mixing apparatus 16. This mixing apparatus 16 preferably has large mixing force to uniformly and surely mix both. As the mixing apparatus 16, for example, a cylinder-type mixing machine, a double wall cone-type mixing machine, a high speed stirring-type mixing machine, a V-character-type mixing machine, a ribbon-type mixing machine, a screw-type mixing machine, a twin arm-type kneader, a pulverizing-type kneader, a rotation-type mixing machine, an air flow-type mixing machine, Turbulizer, a batch-type Rhedige mixer, a continuous Rhedige mixer or the like is suitable.

In the surface cross-linking step, the mixture of the particulate water-absorbing resin and the surface cross-linking agent enables to perform surface cross-linking even at room temperature, however, in view of promotion of the reaction and removal of water and the solvent added, it is preferable that, after mixing the particulate water-absorbing resin and the surface cross-linking agent, further heat treatment is performed to cross-link the neighborhood of the surface of the particulate water-absorbing resin. That is, in order to attain a reaction of the cross-linking agent at the neighborhood of the surface of the particulate water-absorbing resin, in consideration of reactivity of the cross-linking agent, simplicity and productivity of a production facility, or the like, it is preferable to perform heat treatment. In the heat treatment, treatment temperature is preferably equal to or higher than 80° C., although it depends on the surface cross-linking agent selected. The treatment temperature of equal to or higher than 80° C. does not take longer time in the heat treatment, and is capable of preventing decrease in productivity, as well as attaining uniform surface cross-linking. In this case, it is capable of preventing decrease in absorption characteristics under pressure of the particulate water-absorbing agent, as well as remaining of the unreacted surface cross-linking agent. In addition, in view of property, the treatment temperature (temperature of a heating medium or temperature of a material/in particular, temperature of the heating medium) is preferably in a range of 100 to 250° C., more preferably in a range of 150 to 250° C. (it is particularly suitable for the surface cross-linking agent having dehydration esterification reactivity). Heating time is preferably in a range of 1 minute to 2 hours. Suitable examples of a combination of heating temperature and heating time are at 180° C. for 0.1 to 1.5 hour, and at 200° C. for 0.1 to 1 hour. It should be noted that, surface cross-linking at high temperature provides the powder substance with low moisture content, and tends to generate a problem of property decrease caused by damage during conveyance, however, such a problem is also solved in the present invention. For example, the present invention is suitably applicable to transportation of the water-absorbing resin powder substance with the moisture content of ERT430.2-02 of 0 to 3%, in particular, 0 to 2%, and in particular, 0 to 1%.

As the heating apparatus 18 for performing the heat treatment, a conventional dryer or a heating furnace is used. For example, a dryer or a heating furnace of a conductive heat transfer-type dryer, a radiation heat transfer-type dryer, a hot air heat transfer-type dryer, an inductive heating-type dryer is suitable. Specifically, a dryer or a heating furnace of a belt-type, a groove-type stirring-type, a screw-type, a rotation-type, a disk-type, a kneading-type, a fluidized bed-type, an air flow-type, an infrared ray-type, an electron beam-type is included.

In the surface cross-linking step, the heat treatment may be performed in a static state or under stirring. When the heat treatment is performed under stirring, the surface cross-linking may be completed by heating the mixture in the mixing apparatus 16, in which the particulate water-absorbing resin and the surface cross-linking agent are mixed, or the surface cross-linking may be completed by charging the mixture, for example, into a twin-screw groove-type stirring drying apparatus and heating the mixture.

[Cooling Step]

The cooling step is a step for cooling, as needed, the particulate water-absorbing agent obtained by heating in the surface cross-linking step described above and by cross-linking the neighborhood of the surface, before charging to the subsequent step (for example, the granule sizing step) aiming at terminating or controlling a cross-linking reaction. The cooling apparatus 20 to be used in this cooling step is not especially limited, however, for example, a twin-screw stirring dryer or a groove-type stirring-type dryer or the like, having cooling water passed through inside of the inner wall or other heat transfer surfaces, can be used, and temperature of this cooling water is set at below heating temperature, that is, equal to or higher than 25° C. and below 80° C., and preferably 30° C. to 60° C.

It should be noted that, in the surface cross-linking step, there may be the case where surface cross-linking of the particulate water-absorbing resin is performed at room temperature. In this case, because the particulate water-absorbing agent obtained by the surface cross-linking is not heated, this cooling step may not be performed. Therefore, this cooling step is other step which may be contained further in this production method, as needed.

[Addition Step of Additives]

In the present invention, the addition step for adding additives other than the surface cross-linking agent may be installed further. This addition step is preferably installed including and subsequent to the polymerization step, and more preferably installed including and subsequent to the drying step. The additives may be added at the same time as the surface cross-linking or separately, for example, in the cooling step described above or other steps. As the additives, for example, the following (A) a deodorant component (preferably, a plant component), (B) a polyvalent metal salt, (C) an inorganic particle (including (D) a composite water-containing oxide), (E) a liquid permeation improver, (F) other additives and the like may be added. By this addition, various functions can be furnished to the particulate water-absorbing agent. Further, the following (G) chelating agent may be added to this particulate water-absorbing agent.

Use amount of the (A) to (E) and (F) differs depending on objectives and functions to be furnished, however, it is usually, as addition amount of one kind thereof, in a range of 0 to 10 parts by mass, preferably 0.001 to 5 parts by mass, and further preferably 0.002 to 3 parts by mass, relative to 100 parts by mass of the water-absorbing resin. Usually, when this addition amount is lower than 0.001 part by mass, sufficient effect and functions to be furnished by the additives cannot be obtained, and when this addition amount is over 10 parts by mass, effect comparable to the addition amount cannot be obtained or water absorbing performance decreases.

(A) Deodorant Component

The particulate water-absorbing agent can be formulated with the deodorant component, preferably the plant component, in the above amount, to exert deodorant property. The plant component is not especially limited, and exemplified in US-A-2004/048955 specification, WO 2002/42379 pamphlet or the like.

(B) Polyvalent Metal Salt

It is preferable that the particulate water-absorbing agent obtained by the above-mentioned method is formulated with the polyvalent metal salt or a hydroxide of the polyvalent metal, preferably the polyvalent metal salt, more preferably a water-soluble polyvalent metal salt, further more preferably a water-soluble polyvalent metal salt of a trivalent or tetravalent metal, particularly preferably a water-soluble ammonium salt, at the surface of the water-absorbing resin, for aiming at enhancing liquid permeation and powder fluidity at moisture absorption. Preferable amount of this polyvalent metal salt is as described above. It has been discovered that formulation of the polyvalent metal salt decrease conveyance efficiency and property during conveyance in a large degree, therefore, the method of the present invention can be applied suitably. As this polyvalent metal salt, a polyvalent metal salt of an organic acid and a polyvalent metal salt of an inorganic acid described in US-A-2002/0128618 specification, US-A-2006/204755 specification and the like are exemplified. It should be noted that, the water-soluble polyvalent metal salt is a polyvalent metal salt which dissolves in water at normal temperature in equal to or more than 0.1 g/100 g (preferably equal to or more than 1 g/100 g, and particularly preferably equal to or more than 10 g/100 g), and it is mixed as the powder substance or a solution, and the solution may be a dispersion with over saturation concentration.

As a preferable organic polyvalent metal salt, aluminum lactate, calcium lactate or the like is exemplified. In addition, as the preferable inorganic polyvalent metal salt, for example, aluminum chloride, aluminum polychloride, aluminum sulfate, aluminum nitrate, potassium aluminum bisulfate, sodium aluminum bisulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like is included. In addition, use of a salt having crystal water thereof is preferable in view of solubility with a liquid to be absorbed such as urine. A particularly preferable one is an aluminum compound. Among these aluminum compounds, aluminum chloride, aluminum polychloride, aluminum sulfate, aluminum nitrate, potassium aluminum bisulfate, sodium aluminum bisulfate, potassium alum, ammonium alum, sodium alum, sodium aluminate are preferable, and aluminum sulfate is particularly preferable. Powders of water-containing crystal such as aluminum sulfate-octadeca hydrate salt, aluminum sulfate-tetradeca to octadeca hydrate salt may be used most suitably. They may be used as only one kind, or two more kinds may be used in combination. In view of handling property and mixing property with the water-absorbing resin powder substance, the polyvalent metal salt described above is used preferably in a solution state, and is used particularly preferably in an aqueous solution state. Other than these, the polyvalent metal salt of an organic acid and a mixing method thereof are exemplified, for example, in WO-2004/069936 pamphlet. In addition, concentration of the solution may be over the saturation concentration, however, preferably, it is added in a concentration of 10 to 100%, and still more 30 to 100% of the saturation concentration in the normal temperature or heated solution.

Among the polyvalent metal salts, as the water-soluble polyvalent metal salt, aluminum sulfate and various alums are included. According to the conveyance method of the present invention, it is possible to satisfy both problems, which are in contradictory relation; suppression of fracture of the water-absorbing resin powder substance caused by low conveying speed, and prevention of decrease in conveyance efficiency caused by clogging or the like in a transportation pipeline. Therefore, the conveyance method of the present invention is effective in the water-absorbing resin powder substance containing the water-soluble polyvalent metal salt. The water-absorbing resin powder substance containing the polyvalent metal salt has the surface difficult to slip, and large friction coefficient at the surface. In particular, in the case of the water-soluble polyvalent metal salt such as aluminum sulfate or the like, increase in this friction coefficient is significant. Caused by this high friction coefficient, obstruction phenomenon tends to generate. When air pressure is increased to suppress this obstruction phenomenon, moving velocity (an initial linear velocity Vx and a terminal linear velocity Vy) of the water-absorbing resin powder substance in the transportation pipeline increases, which increases damage of the water-absorbing resin powder substance. The present invention is capable of decreasing the initial linear velocity Vx and the terminal linear velocity Vy, as well as suppressing the obstruction phenomenon, therefore it is effective in the water-absorbing resin powder substance containing the water-soluble polyvalent metal salt. In addition, the present invention is capable of suppressing the initial linear velocity Vx and the terminal linear velocity Vy, therefore peeling of the polyvalent metal salt from the surface of the powder substance caused by mutual friction can be suppressed. Therefore, property enhancement effect by the polyvalent metal salt is difficult to be impaired.

(C) Inorganic Particle

The particulate water-absorbing agent may be formulated with the inorganic particle, in particular, a water-insoluble inorganic particle (water-insoluble fine particles) at the surface of the water-absorbing resin, in order to enhance liquid permeation or prevent blocking in moisture absorption. As the inorganic particle, specifically, for example, a metal oxide such as silicon dioxide or titanium oxide; silicic acid (salt) such as natural zeolite or synthetic zeolite; kaolin, talc, clay, bentonite or the like is included. Among these, silicon dioxide and silicic acid (salt) are more preferable, and silicon dioxide and silicic acid (salt), having an average particle diameter of 0.001 to 200 μm, measured by the Coulter counter method, is further preferable.

To make exert superior hygroscopic fluidity (fluidity of powders after the water-absorbing resin or the water-absorbing agent absorbed moisture), and superior deodorant function of the particulate water-absorbing agent, a composite water-containing oxide containing zinc and silicon, or a composite water-containing oxide containing zinc and aluminum may be formulated.

When inorganic particles are formulated, a problem of decrease in conveyance efficiency or decrease in property during conveyance in a large degree has been discovered, however, in the present invention, the initial linear velocity Vx (linear velocity of the water-absorbing resin powder substance at the start point of the transportation pipeline) can be suppressed, therefore peeling of the inorganic particles from the surface of the powder substance caused by mutual friction can be suppressed, and as a result, property enhancement effect by the inorganic particles is difficult to be impaired. Therefore, the method of the present invention is applicable suitably.

(D) Polyamine Compound (Polyvalent Amine Compound)

A polyamine may be added aiming at enhancing liquid permeation and enhancing shape retention property of the particulate water-absorbing agent. For example, a water-soluble polyamine polymer, in more specifically, polyethyleneimine, polyvinylamine, polyallylamine, having a weight average molecular weight of 200 to 1000000, or the like may be exemplified. In the particulate water-absorbing agent, they are used for surface covering or cross-linking of the water-absorbing resin. A polyamine polymer applicable to the water-absorbing resin is exemplified, for example, in US-A-2003/069359 specification, US-A-2005/0245684 specification, WO 2006/082197 pamphlet, WO 2006/074816 pamphlet, WO2006/082189 pamphlet, WO 2008/025652 pamphlet, WO 2008/025656 pamphlet, WO 2008/025655A1 pamphlet or the like.

(E) Liquid Permeation Improver

The liquid permeation improver means the additive for enhancing saline flow conductivity (SFC) of the water-absorbing resin or the water-absorbing agent having a saline flow conductivity (SFC) of equal to or higher than 6 ($10^{-7} \cdot cm^3 \cdot s \cdot g^{-1}$) to be described later, by equal to or higher than 10 ($10^{-7} \cdot cm^3 \cdot s \cdot g^{-1}$). Preferably, it is a compound for enhancing liquid permeation by maintaining or expanding a space between particles, as an ion-like spacer (cation), or a stereoscopic spacer (fine particles). Therefore, even the additives exemplified in the (A) to (D) may be the case corresponding to this liquid permeation improver. In the conveyance method of the present invention, it is preferable that this liquid permeation improver is the (B) to (D).

Among these, the water-soluble polyvalent metal salt such as aluminum sulfate, potassium alum, exemplified by the (B) and is capable of being an ion-like spacer, is preferable in view of enhancing saline flow conductivity (SFC).

A form of the liquid permeation improver present in the particulate water-absorbing agent may be in a particulate state, or may be a coating state in a molecular level (usually, a coating with a solution), or may be in a combined state using them. However, the liquid permeation improver is preferably used in an aqueous solution form, in view of easy addition more uniformly to the whole surface of the water-absorbing resin, and no segregation or the like of the liquid permeation improver. The liquid permeation improver is used preferably in a ratio of 0.001 to 10% by weight, and more preferably in a ratio of 0.01 to 5% by weight, relative to the water-absorbing resin.

(F) Surfactant

It is preferable that the water-absorbing agent contains a surfactant. Presence of the surfactant is capable of enhancing powder substance characteristics (fluidity of the powder substance or fluidity in humidity absorption or the like). In particular, it is preferable that the surfactant is present at the surface of the water-absorbing resin.

As the surfactant, an anionic surfactant such as a fatty acid salt or a higher alcohol sulfate or the like; a nonionic surfactant such as a sorbitan fatty acid ester such as sorbitan monolaurate, sorbitan monopalmitate, sorbitan monostearate, sorbitan tristearate or the like; a cationic surfactant or an ampholytic surfactant such as an alkyl amine salt such as coconut amine acetate, stearyl amine acetate or the like is exemplified. Other than these, a surfactant described in U.S. Pat. No. 6,107,358 is applicable to the present invention. It should be noted that the addition method for the surfactant is not especially limited, and preferably it is added at the granulation step exemplified in U.S. Pat. No. 6,228,930, U.S. Pat. No. 6,458,921, U.S. Pat. No. 7,153,910 and U.S. Pat. No. 7,378,453. In addition, the addition timing of the surfactant is also not especially limited, and any timing may be allowed, for example: (a) the surfactant is added in an aqueous solution of acrylic acid in the polymerization step, and polymerization is performed in the presence of the surfactant; (b) the surfactant is added to the water-containing gel after polymerization in the polymerization step; (c) the surfactant is added during or after drying in the drying step; (d) the surfactant is added during or after pulverization or classification of the dried substance in the pulverization or classification step; (e) the surfactant is added during or after surface cross-linking in the surface cross-linking step; (f) the surfactant is added to the water-absorbing resin as a final product; or the like. It should be noted that the surfactant may be added before or after the surface cross-linking step so as to be contained at the surface.

Use amount of the surfactant is preferably 0.0005 to 0.012 part by weight, more preferably 0.0005 to 0.001 part by weight, still more preferably 0.001 to 0.0045 part by weight, and particularly preferably 0.0015 to 0.004 part by weight relative to 100 parts by weight of the water-absorbing resin. The amount below 0.0005 part by weight may provide the case of insufficient enhancement of fluidity and bulk density. On the other hand, the amount over 0.012 part by weight has a problem of decrease in surface tension of a liquid to be absorbed, as well as may provide the case of not able to exert effect comparable to the addition amount, and is thus uneconomical.

The surfactant to be used in the present invention is not limited to the above surfactants. Among the above surfactants, in view of safety, nonionic surfactants are preferable, and among them, a sorbitan fatty acid ester and a polyoxyethylene sorbitan fatty acid ester are particularly preferable. In addition, HLB (hydrophile-lipophile balance) of the surfactant to be used in the present invention is not especially limited, however, it is in a range of preferably 8 to 18, more preferably 9 to 17, and still more preferably 10 to 17. When HLB is within this range, fluidity and bulk density of the particulate water-absorbing agent can be enhanced more suitably.

(G) Chelating Agent

The water-absorbing resin powder substance to be used in the present invention may contain a chelating agent for coloring prevention, urine resistance enhancement or the like. A step for mixing the chelating agent is not especially limited, however, it is preferable that the chelating agent is mixed into the monomer or the monomer solution. The chelating agent described above is not especially limited, and for example, a chelating agent exemplified in EP-A-1426157, WO2007/28751 and WO 2008/90961 can be used. From a view of effect, a water-soluble organic chelating agent having molecular weight of 100 to 1000 is preferable. As a specifically preferable chelating agent, for example, an amino carboxylic acid-based metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexaacetic acid, and a salt thereof; and an amino polyvalent phosphoric acid compound such as ethylenediamine-N,N'-di(methylenephosphonic acid), ethylenediamine tetra(methylenephosphonic acid), polymethylenediamine tetra(methylenephosphonic acid), diethylenetriamine penta(methylenephosphonic acid), 1-hydroxyethylidene diphosphonic acid, and a salt thereof; is included. It is desirable that use amount of the chelating agent is equal to or more than 0.001 part by mass, preferably equal to or more than 0.05 part by mass, and still more preferably equal to or more than 0.1 part by mass, relative to 100 parts by mass of the water-absorbing resin contained in the water-absorbing resin powder substance; as well as equal to or less than 1 part by mass, preferably equal to or less than 0.5 part by mass, and still more preferably equal to or less than 0.2 part by mass, relative to 100 parts by mass of the water-absorbing resin.

The (B) and (C) described above can be used suitably as a surface treatment agent. In this application, surface treatment means that a region of the surface or the neighborhood of the surface of the water-absorbing resin is surface cross-linked by chemical or physical modification. Here, chemical modification means a state of modification accompanying with any of a chemical bonding (covalent bond or ionic bonding), and physical modification means physical covering or adhesion without accompanying with the chemical bonding.

(H) Lubricant (Slip Property Improver)

It is preferable that the particulate water-absorbing agent contains a lubricant. In particular, it is preferable that the lubricant is contained at the surface of the water-absorbing resin. The "lubricant" means a substance present between two surfaces mutually slipping, and has an action to decrease friction (resistance). The lubricant which can be used in the present invention is not especially limited, as long as it is a solid lubricant at normal temperature (25° C.) and under normal pressure (0.101 MPa). The lubricant is exemplified in U.S. Pat. No. 7,473,739 specification, WO 2008/120742 pamphlet or the like, and the lubricant exemplified therein may be used preferably also in the present invention. For example, a hydrocarbon-based lubricant, a fatty acid-based lubricant (preferably having equal to or more than C12), a fatty acid amide-based lubricant, an ester-based lubricant, an alcohol-based lubricant (glycol or a higher alcohol), a metal soap lubricant or the like is included. Among them, in view of having a function as a lubricant as well as also having a function as a stabilizer, it is preferable to use a metal soap lubricant exemplified in U.S. Pat. No. 7,282,262 specification.

Powder substance temperature of the water-absorbing resin in mixing with the lubricant is usually set at equal to or higher than room temperature, however, it is mixed preferably at equal to or higher than 40° C., and more preferably at equal to or higher than 50° C., to obtain stable water absorbing characteristics or flow down speed or bulk density of the particulate water-absorbing agent. The amount is preferably 0.0001 to 0.1% by weight, more preferably 0.01 to 0.05% by weight, and particularly preferably 0.001 to 0.01% by weight, relative to 100% by weight of the water-absorbing resin.

In particular, in the present invention, as the additive to enhance liquid permeation, (B) the polyvalent metal salt is preferable. It is preferable that the polyvalent metal salt is mixed after the addition. As an apparatus for mixing, the mixing apparatus 16, the same as for the surface cross-linking agent may be included.

It should be noted that, the polyvalent metal salt is preferably mixed with the water-absorbing resin particles (the particulate water-absorbing resin) as an aqueous solution. Size of a droplet of the aqueous solution can be adjusted as appropriate. In view of preventing permeation and diffusion of a polyvalent metal ion (for example, an aluminum ion) into the inside of the water-absorbing resin particles, the aqueous solution preferably has a concentration of equal to or higher than 50%, more preferably equal to or higher than 60%, further preferably equal to or higher than 70%, further preferably equal to or higher than 80%, and particularly preferably equal to or higher than 90%, relative to the saturated concentration. Naturally, it may have the saturated concentration (=100% relative to the saturated concentration). In addition, from the similar reason, use amount of water is about 0.1 to 30% by weight, and still more about 0.2 to 10% by weight relative to weight of the water-absorbing resin, and drying may be performed after the addition as needed.

[Granule Sizing Step]

Irrespective of adjustment of the particle diameter in the pulverization step and classification step described above, there may be the case where an aggregated substance having large particle diameter is included in the particulate water-absorbing agent after the surface cross-linking step or the cooling step. This aggregated substance may be generated principally in mixing of the surface cross-linking agent, or in a surface cross-linking reaction. In this granule sizing step, in order to re-adjust the particle size, the crushing treatment and the classification treatment of this aggregated substance is performed. Performing order and number of times of this crushing treatment and classification treatment are not especially limited. In this granule sizing step, for example, firstly the classification treatment is performed for the particulate water-absorbing agent. In this classification treatment, a classification apparatus such as a sieve or an air flow classification machine is used to remove the aggregated substance with large particle diameter or the fine powders with small particle diameter. For the aggregated substance obtained by this classification treatment, the crushing treatment is performed to crush and separate particles composing the aggregated substance to an individual particle. In this crushing treatment, for example, a knife cutter-type crushing machine is used. For the crushed substance obtained by this crushing treatment, the classification treatment is performed again to remove the fine powders having small particle diameter, as well as to obtain the particulate water-absorbing agent having desired particle diameter (preferably, a weight average particle diameter of 200 to 800 μm). In view of productivity, it is preferable that this granule sizing step is performed after the cooling step. It should be noted that in the method of the invention of this application, when the aggregated substance with large particle diameter is not contained in the particulate water-absorbing agent before charging to this granule sizing step, this granule sizing step may not be performed. This granule sizing step is other step which may be contained further in the conveyance method of the present invention, as needed. A granule sizing method is exemplified in U.S. Pat. No. 7,347,330 specification, US-A-2005/0113252 specification or the like.

[Packaging Step]

The packaging step is a step where the particulate water-absorbing agent is packaged. When the granule sizing step is performed, in this packaging step, the particulate water-absorbing agent, which was granule-sized in the above-described granule sizing step, is packaged. For example, in this packaging step, the particulate water-absorbing agent transferred to a hopper for storage is filled into a storing bag using the filling apparatus 24. The particulate water-absorbing agent filled in the storing bag is shipped as a product via the predetermined inspection.

[Fine-Powder Recycling Step]

The fine-powder recycling step is a step for returning the fine powders removed by classification or the like (for example, particles containing particles below 150 μm as a principal component, in particular, in an amount of equal to or more than 70% by weight) to the production step of the water-absorbing resin, in various objects such as reducing the fine powders and the like, and preferably by recycling to the polymerization step or the drying step, removal and reuse of the fine powders are possible. That is, in one embodiment of the present invention, the water-absorbing resin powder substance contains a fine powder recycled substance of the water-absorbing resin. In such a recycling step, the fine powders may be returned as themselves, or may be recycled after pulverization in a pulverization step to be described later. A recycling method includes: mixing of the fine powders into a polymerization machine, preferably a stirring polymerization machine such as a kneader or the like to make a unified substance; mixing of the fine powders or a granulated substance thereof with polymer gel separately after polymerization; (crushing) mixing with a meat chopper, for example; or mixing in a dryer.

Conventionally, as estimated to be derived from fracture or regeneration of the granulated substance of the fine powders, the water-absorbing resin via such a fine-powder recycling step, that is, the water-absorbing resin containing the fine powder recycled product tended to decrease property easily in the transportation step, however, in the present invention, there are no such problems as well, because the fine powders are removed in the fine-powder recycling step, and also property enhances, as well as impact is suppressed without accompanying with decrease in conveyance efficiency in pneumatic conveyance.

A preferable fine-powder recycling method is exemplified, for example, in U.S. Pat. No. 6,133,193 specification, U.S. Pat. No. 6,228,930 specification, U.S. Pat. No. 5,455,284 specification, U.S. Pat. No. 5,342,899 specification, US-A-2008/0306209 specification, and preferably, amount of the fine powders is decreased by adding the fine powders in the production step of the water-absorbing resin such as the polymerization step, the gel pulverization step, the drying step, or the like. In addition, recycling amount of the fine powders is determined as appropriate, for example, in about 1 to 30% by weight, still more 5 to 25% by weight, particularly 8 to 20% by weight of production amount. In addition, the fine powders are recycled to the production step as dry powders as themselves, or by gelling by adding water as needed, or in particular, recycled to a monomer and/or gel (before drying or during polymerization).

[Granulation Step]

The granulation step is a step for obtaining the granulated particle by adding aqueous liquid to the fine powders. The fine powders may be obtained, for example, by the classification step. The fine powders may be those collected with a fine powder capturing apparatus 26 from atmosphere of other step (the pulverization step or the granule sizing step). The fine powder capturing apparatus 26, for example, is provided with a filter which is capable of capturing the fine powders. The granulated particle is composed of a plurality of the fine powders. Weight average particle diameter of the granulated particle is equal to or smaller than 20 mm, preferably 0.3 to 10 mm, and more preferably 0.35 to 5 mm. It should be noted that the granulation may be performed using only the fine powders (for example, a substance passed 150 μm), or may be performed using the whole particles containing the fine powders (the whole water absorbing resin powder substance which is a substance passed 850 μm, containing a substance passed 150 μm in a predetermined amount).

The granulated particle obtained by the granulation step may be used as it is as a granulated product, however, it is preferably charged to any of the steps described above. In view of production efficiency, it is preferable that this granulated particle is charged to the drying step as the fine particle recycling step and dried in the co-presence of the above-described polymer gel. As shown in FIG. 1, in this production facility 2, the transportation part 6 jointed to the fine powder capturing apparatus 26 is jointed to the granulation apparatus 28. This granulation apparatus 28 is jointed to the drying apparatus 10 via the transportation part 6. The fine powders discharged from the fine powder capturing apparatus 26 are charged to the granulation apparatus 28 by being transported using the transportation part 6. The fine powders are also the water-absorbing resin powder substance. The granulated particle formed at this granulation apparatus 28 is also put to the drying apparatus 10 by being transported using the transportation part 6. It can be confirmed for the particulate water-absorbing agent to be the granulated particle using an optical microscope, from the fact that an individual particle is aggregated by gathering in multiple while maintaining shape thereof, or from the fact that it swells as a plurality of discontinuous particles in absorbing liquid.

[Storage Step]

Figure 2:
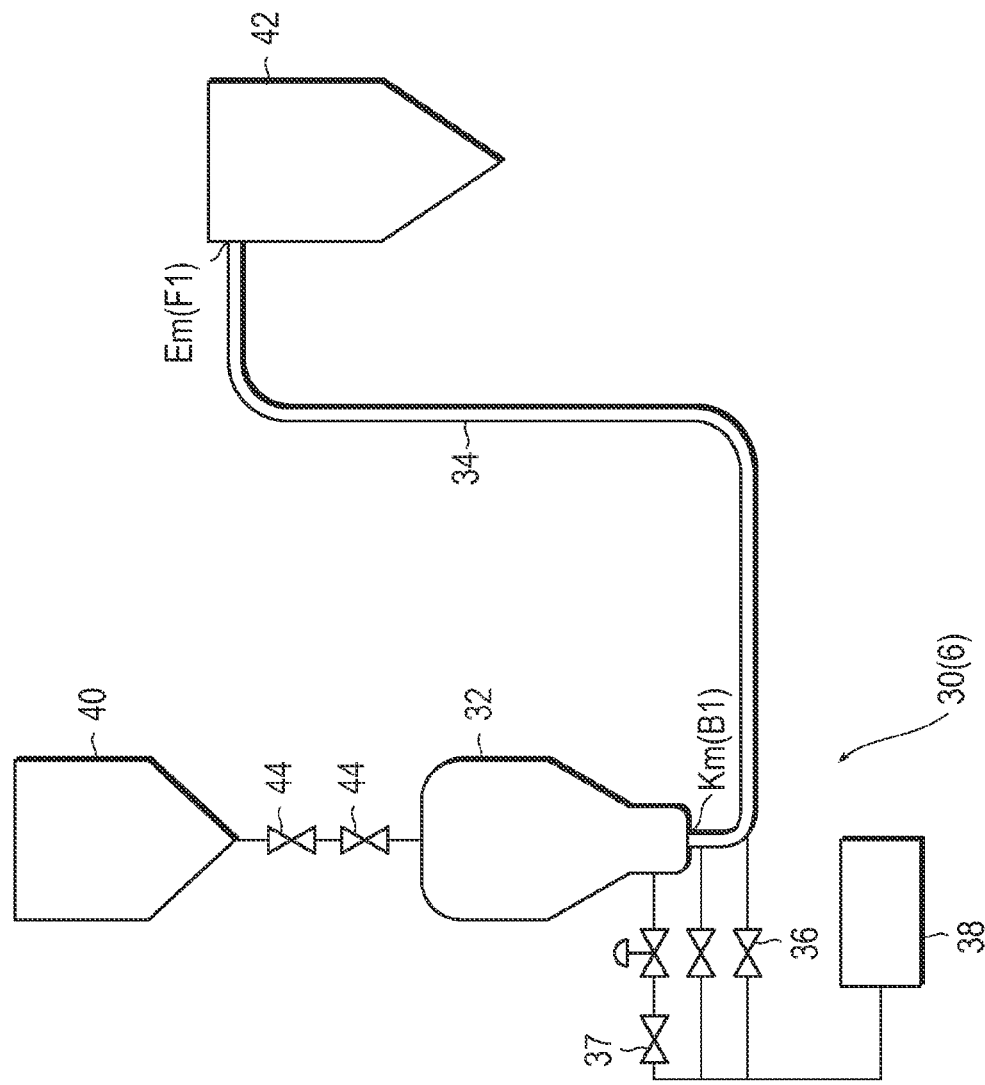
FIG. 2 is a drawing showing a schematic configuration of a transportation apparatus to be used in one embodiment of the present invention.

It is preferable that the conveyance method for the water-absorbing resin powder substance of the present invention includes the storage step of the water-absorbing resin powder substance. An apparatus to be used in the storage step is called "a hopper" in the present invention. The hopper is an apparatus for storing and managing the water-absorbing resin powder substance temporarily or for a long period, and in the present invention, a silo-like (longitudinally longer shape) one is also included, as long as it is specified shape. Specifically, as shown in FIG. 2, an apparatus such as a receiving hopper 40, a pressurized tank hopper 32, a storage hopper 42 or the like is included. It should be noted that detail of FIG. 2 will be described later.

By using the hopper, feeding becomes possible to an apparatus to be used in each step, in quantitative mass flow, without damaging or fracturing the water-absorbing resin powder substance. In this way, the water-absorbing resin with high function and high property can be produced stably without variation by lot.

Figure 3:
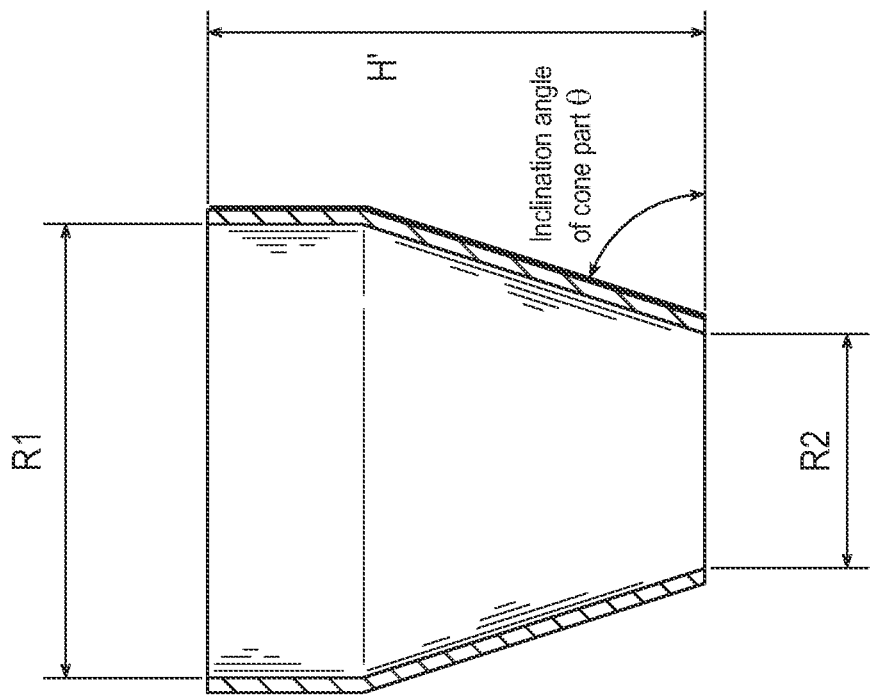
FIG. 3 a schematic view showing maximum caliber part (R1) of the upper part of a hopper, and caliber (R2) and height (H) of the discharging part of the hopper, specifying ratio of cone part inclination angle and drawing rate, and ratio of maximum caliper (diameter) and height of the hopper, relating to the hopper which can be used in one embodiment of the present invention.
Figure 3:
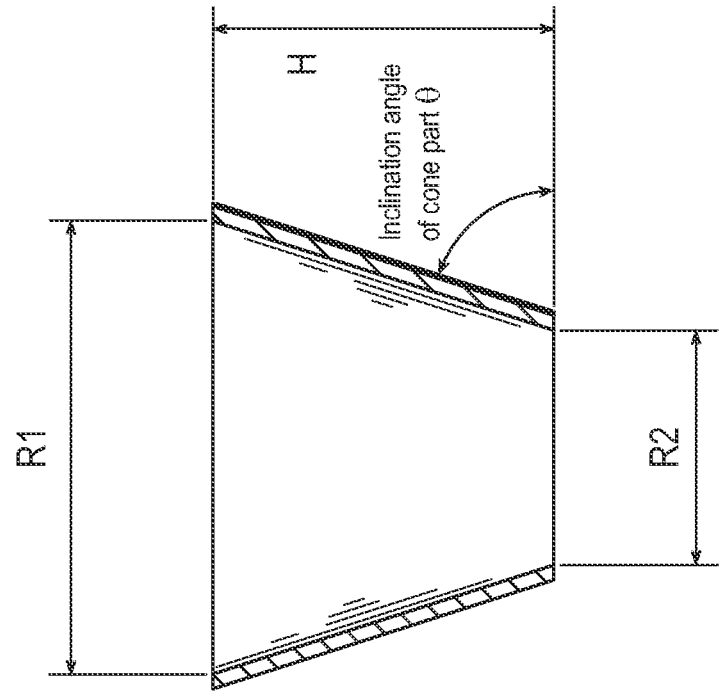

FIG. 3 is a schematic view of the hopper which can be used in one embodiment of the present invention. As shape of the hopper, in view of carrying property and transferring property of the powder substance, in particular, the water-absorbing resin powder substance, a reversed truncated pyramid shape or a reversed circular truncated cone shape, as shown in the left drawing of FIG. 3, along with the reversed truncated pyramid shape in which a rectangular column of the same shape is added at the maximum caliber part thereof, or the reversed circular truncated cone shape in which a circular cylinder of the same shape is added at the maximum caliber part thereof, as shown in the right drawing of FIG. 3, are preferably used. In addition, ratio of maximum caliber (diameter) and height of the hopper (maximum caliber of the hopper/height of the hopper, for example, "R1/H" in FIG. 3) is in a range of 1/10 to 10/1, still more 1/3 to 3/1, and particularly 1/2 to 2/1. In this case, for the reversed truncated pyramid shape or the reversed circular truncated cone shape, as shown in the left drawing of FIG. 3, "height of the hopper" indicates height of the reversed truncated pyramid part or the reversed circular truncated cone part ("H" in the left drawing of FIG. 3). In addition, for the reversed truncated pyramid shape or the reversed circular truncated cone shape added with the rectangular column or the circular cylinder, as shown in the right drawing of FIG. 3, it indicates total height which is height of the reversed truncated pyramid part or the reversed circular truncated cone part, added with height of the rectangular column part or the circular cylinder part ("H'" in the right drawing of FIG. 3). In addition, when the hopper is not a cylinder, maximum caliber of the hopper is specified by conversion to a diameter of a circle equivalent to the maximum cross-section thereof. As for shape of the reversed truncated pyramid shape or the reversed circular truncated cone shape, as ratio of the reversed pyramid (or the reversed circular cone) and the truncated part, it is adopted one where height of the truncated part is smaller, or in the case where the hopper cross-section has home base shape, cross-section of the triangle part thereof is adopted principally. That is, a principal component of the water-absorbing resin powder substance, preferably equal to or more than 50% by weight, and still more preferably equal to or more than 80% by weight is stored in a part of pyramid or circular cone of the hopper.

In the present invention, it is preferable to use the hopper having specified shape of a cone inclination angle of equal to or larger than 45 degrees, and a drawing rate of 0.3 to 0.8. The upper limit of the cone inclination angle is preferably below 90 degrees. In this specification, "the cone inclination angle" is, as shown in FIG. 3, inclination angle of a side wall surface relative to a horizontal surface of the hopper installed. The cone inclination angle of the hopper of the present invention is set at preferably equal to or larger than 50 degrees, still more preferably 60 to 90 degrees, particularly preferably 65 to 85 degrees, and most preferably 68 to 85 degrees. It should be noted that when the side wall surface is not flat, it is specified by average value of angles determined from the whole side wall surfaces thereof.

In addition, in this specification, "the drawing rate" is a value of ratio (R2/R1×100) specified by caliper of the opening part of the upper surface of the hopper (maximum caliper part of the upper part of the hopper (R1)) and the opening part of the bottom surface of the hopper (caliper of the discharging part of the hopper (R2)), expressed in percent. The aperture ratio of the hopper is set at preferably 30 to 80%, more preferably 35 to 80%, still more preferably 40 to 80% and particularly preferably 40 to 70%. It should be noted that when the caliper is not a circle, for example, an ellipse or a polygon, it is specified by converting to a circle equivalent to the cross-section thereof. When the hopper within the above range is used, the water-absorbing resin with desired high property can be produced stably.

In addition, a filling rate (average) of the water-absorbing resin powder substance in the hopper is over 0% by volume and equal to or lower than 90% by volume, preferably 10 to 80% by volume, still more preferably 30 to 80% by volume, and particularly preferably 40 to 80% by volume. In this specification, "the filling rate" is specified by volume ratio (% by volume) of the water-absorbing resin to be filled relative to inner volume of the hopper, and by controlling it within the above range, transfer property of the water-absorbing resin becomes good.

A material of the hopper is not especially limited, however, stainless steel is preferable, and surface roughness or the like of the inner surface thereof is in accordance with the pipeline of the pneumatic transportation apparatus to be described later.

It is preferable that a residence time (average) of the water-absorbing resin in the hopper is also controlled, and the residence time is preferably equal to or shorter than 24 hours, more preferably equal to or shorter than 12 hours, still more preferably equal to or shorter than 6 hours and particularly preferably equal to or shorter than 2 hours, although it depends on amount of the water-absorbing resin filled in the hopper. The case where the residence time is over 24 hours may generate property decrease or blocking, and is thus not preferable. It should be noted that the lower limit of the residence time (average) of the water-absorbing resin in the hopper is not especially limited, and it is preferable to be as short as possible.

It should be noted that, as an embodiment which most exerts effect of the present invention, the method of the present invention is applied to a conveyance method in producing the water-absorbing resin in a production amount of, for example, equal to or higher than 100 kg per hour, preferably equal to or higher than 500 kg per hour, and particularly preferably equal to or higher than 1 ton per hour.

Further, it is preferable that the hopper is heated, and temperature of the surface thereof is preferably in a range of 40 to 120° C., still more preferably 50 to 90° C., and particularly preferably 60 to 80° C. In addition, it is preferable that the water-absorbing resin powder substance stored in the hopper is also heated, and temperature thereof is preferably in a range of 40 to 120° C., still more preferably 50 to 90° C., and particularly preferably 60 to 80° C. The case of lower temperature than the above may generate a case of property decrease or increase in variation width of property value, and aggregation of the water-absorbing resin. In addition, the case of higher temperature than the above may generate a case of property decrease or increase in variation width of property value, as well as coloring of the water-absorbing resin.

In addition, a moisture content of the water-absorbing resin powder substance to be stored in the hopper is not especially limited, however, preferably 0.1 to 30% by weight, and more preferably 0.1 to 10% by weight. By setting the moisture content at the above range, in storing (or filling) the water-absorbing resin powder substance in the hopper, damage can be reduced and property decrease can be suppressed.

When the powder substance (the water-absorbing resin powder substance) is handled in each step, the hopper is applied at each step, in discharging the powder substance after storage of the powder substance in at least one or more positions of including and subsequent to the drying step. That is, the hopper may be applied at any time during the drying step; during the pulverization or classification step; during the surface cross-linking step; between the drying step and the pulverization or classification step; between the pulverization or classification step and the surface cross-linking step; during or after the step for filling the water-absorbing resin, obtained as the final product at including and subsequent to the surface cross-linking step, into a container bag or the like (the filling step); between the surface cross-linking step and the filling step; or the like. In addition, the hopper may be installed at one place, or at two or more places at each of the time. Still more, in the latter case, a plurality of the hoppers may be installed continuously, or other step (or an apparatus) may be installed between the hoppers.

Carrying of the water-absorbing resin powder substance from the previous step to the storage step or carrying from the storage step to the next step using the hopper is preferable performed by pneumatic conveyance to be described later. The conveyance method relevant to one preferable embodiment of the present invention has a step for storing the water-absorbing resin powder substance after the pneumatic transportation step. According to such an aspect, there is no property decrease caused by impact, as well as quality of high property can be maintained stably, and is thus preferable.

Outline of the production step of the particulate water-absorbing agent relevant to the present invention is as described above. Explanation will be given next on the conveyance (transportation) method relevant to the present invention.

In the present invention, pneumatic conveyance is applied to conveying of the water-absorbing resin powder substance generated in each of the steps (the particulate water-absorbing resin and the particulate water-absorbing agent). Pneumatic conveyance is performed by the transportation part 6 shown in FIG. 1. Pneumatic conveyance is not suitable between the polymerization apparatus 8 and the drying apparatus 10, between the mixing apparatus 16 and the heating apparatus 18, and between the granulation apparatus 28 and the drying apparatus 10, because a substance to be transported is moist (it is not intended to exclude application of pneumatic conveyance), however, in other transportation part 6, pneumatic conveyance can be used suitably because the substance to be transported (the water-absorbing resin powder substance) is in a dry state. In the present invention, pneumatic conveyance may be used in at least one place, or at two or more places among the transportation part 6 of FIG. 1. For the transportation part 6, where pneumatic conveyance is not adopted, a mechanical conveyance, for example, a conveyor or the like can be adopted.

FIG. 2 is a schematic view of a pneumatic transportation apparatus 30 which can be used in one embodiment of the present invention. The pneumatic transportation apparatus 30 has a pressurized tank hopper 32, a transportation pipeline 34, a pipeline for the secondary air (not shown), a valve 37, a valve for the secondary air 36, and a compressor 38. The compressor 38 is connected to the pressurized tank hopper 32 via the valve 37. By the compressor 38, inside of the pressurized tank hopper 32 can be pressurized. In addition, the compressor 38 is connected to the transportation pipeline 34 via the valve 37. The compressor 38 can supply air of the transportation pipeline 34. The secondary air is supplied via the valve 36. The secondary air is supplied to the pipeline for the secondary air via the valve 36. The compressor 38 can supply air (the secondary air) of the pipeline for the secondary air. In FIG. 2, one compressor 38 is drawn, however, the compressor 38 may be present in multiple. It should be noted that a method for supplying the secondary air is present variously and is not limited to the method of the present embodiment. A method for supplying secondary air is described in Non-Patent Document 1.

In the embodiment of FIG. 2, the pneumatic transportation apparatus 30 transports the water-absorbing resin powder substance from a receiving hopper 40 to the storage hopper 42. For example, it is assumed the case where the pneumatic transportation apparatus 30 connects an apparatus for performing a step X, and an apparatus for performing a step Y. The step X and the step Y are not especially limited. The step Y is the next step of the step X. In this case, in the receiving hopper 40, the water-absorbing resin powder substance generated by the step X is stored. In addition, the water-absorbing resin powder substance transported by the pneumatic transportation apparatus 30 is stored in the storage hopper 42 and supplied to the step Y. That is, in the present embodiment, the hoppers (40, 32) are installed after the step X, and after the water-absorbing resin powder substance is stored in the hopper (the storage step), the water-absorbing resin powder substance is pneumatically conveyed via the transportation pipeline 34 (the pneumatic transportation step), and the water-absorbing resin powder substance transported is stored in the hopper (42) before the step Y (the storage step). It should be noted that the storage hopper 42 corresponds to a storage part in the embodiment of FIG. 5 to be described later. The water-absorbing resin powder substance stored in the receiving hopper 40 is fallen into the pressurized tank hopper 32 by opening a valve 44. Next, the valve 44 is closed to introduce pressurized air into the pressurized tank hopper 32. By pressure of this air (primary air), the water-absorbing resin powder substance in the pressurized tank hopper 32 is moved inside the transportation pipeline 34, reaching the storage hopper 42.

In the present invention, pneumatic conveyance is possible even by primary air only, however, by further using the secondary air, more preferable transportation can be performed. In this specification, the secondary air 41 is air supplied to the transportation pipeline 34 via the pipeline for secondary air. On the contrary, air supplied to the transportation pipeline 34 not via the pipeline for the secondary air is also called the primary air in this application. The primary air includes air flowing in from the pressurized tank hopper 32 to the transportation pipeline 34, or air supplied from the compressor 38 to the transportation pipeline 34 directly.

Figure 4:
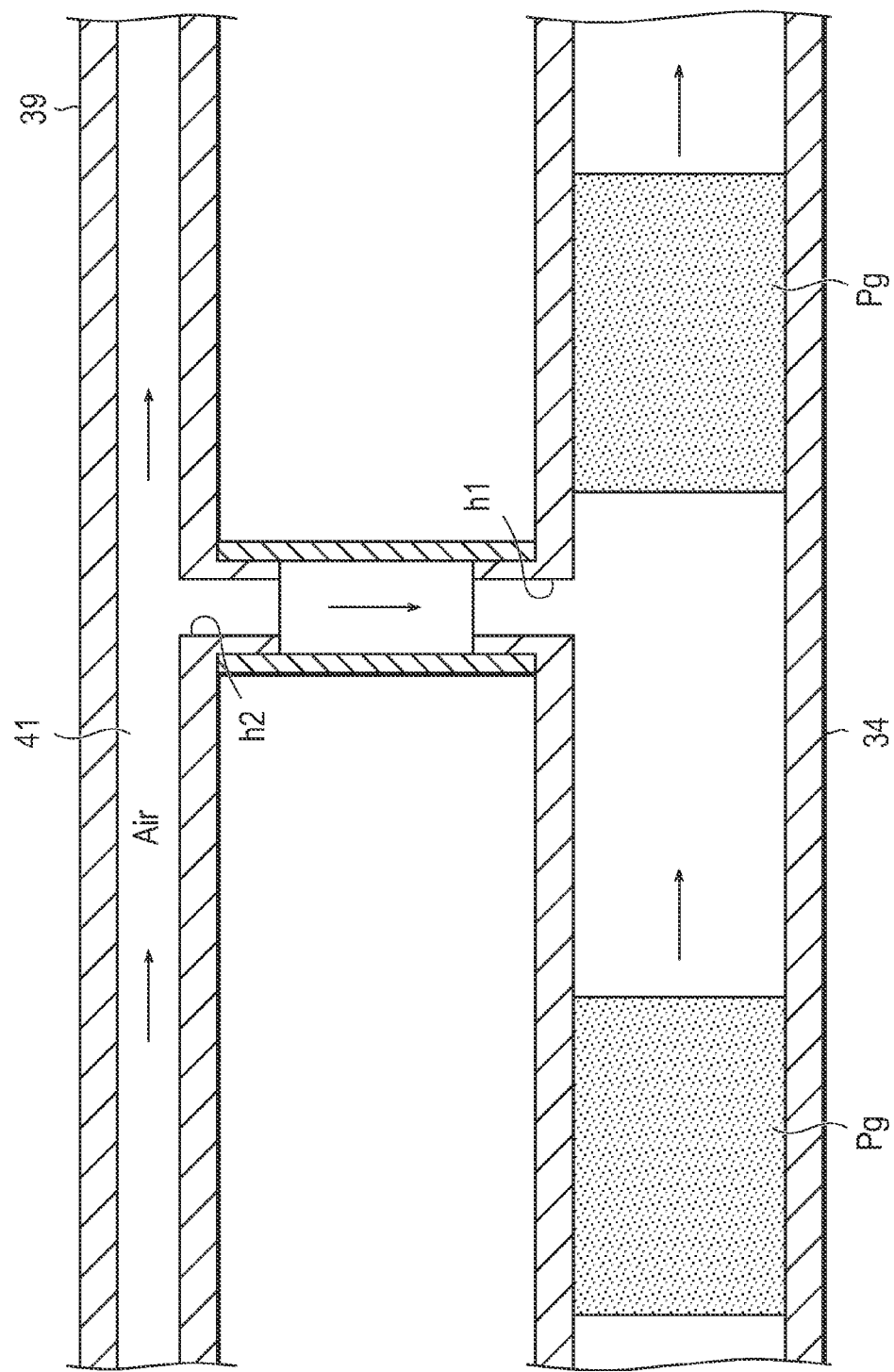
FIG. 4 is a cross-sectional view where a part of FIG. 2 is magnified.

FIG. 4 is a cross-sectional view where a part of FIG. 2 is magnified. FIG. 4 shows the transportation pipeline 34 and the pipeline for the secondary air 39. As shown in FIG. 4, secondary air 41 is supplied from the pipeline 39 installed together at the transportation pipeline 34. The transportation pipeline 34 has an introduction hole h1 of the secondary air. At a plurality of positions in a longitudinal direction of the transportation pipeline 34, the introduction hole h1 of the secondary air is installed. The pipeline for secondary air 39 has a discharging hole h2 of the secondary air. At a plurality of positions in a longitudinal direction of the pipeline for secondary air 39, the discharging hole h2 of the secondary air is installed. The position of discharging hole h2 of the secondary air corresponds to the position of the introduction hole h1 of the secondary air. At each of the introduction hole h1 of the secondary air, each of the discharging hole h2 of the secondary air is connected. By this connection, secondary air is introduced from each of the introduction hole h1 of the secondary air. It should be noted that, in FIG. 4, the introduction hole h1 of the secondary air is drawn as a hole with large inner diameter, however, practically, the introduction hole h1 of the secondary air is a nozzle (air nozzle).

By secondary air introduced from the introduction hole of the secondary air h1, the water-absorbing resin powder substance as a substance to be conveyed is divided. The water-absorbing resin powder substance thus divided moves inside the transportation pipeline 34 while forming a plug Pg (refer to FIG. 4). High-density pneumatic conveyance is defined as pneumatic conveyance of the water-absorbing resin powder substance while forming the plug Pg in this way. It should be noted that, practically, it is rare that the plug Pg with regular shape is maintained always during conveyance, as shown in FIG. 4. In practical high-density pneumatic conveyance, conveyance is performed while repeating the following series of behaviors. This series of behaviors are as follows: a deposited layer of the powder substance is formed at the bottom of the transportation pipeline; this deposited layer grows to become a hill-like bulk; this bulk grows further to become the plug Pg; this plug Pg moves; and this plug Pg collapses.

In the present invention, the variation of a solid-gas ratio (R1/R2) is taken into consideration. Here, R1 (kg-resin/kg-air) is an initial solid-gas ratio at the start point Km of the transportation pipeline 34, and R2 (kg-resin/kg-air) is a terminal solid-gas ratio at the terminal point Em of the transportation pipeline 34.

In the present application, "solid-gas ratio" is value obtained by dividing mass of the water-absorbing resin powder substance (kg) with mass of air (kg). In the present application, unit of this solid-gas ratio is expressed as (kg-resin/kg-air).

A calculation method for initial solid-gas ratio R1 is as follows. Initial solid-gas ratio R1 is calculated by dividing mass Wr1 of the water-absorbing resin powder substance passed the start point Km of the transportation pipeline per unit time, with air mass Wa1 of air passed the relevant start point Km of the transportation pipeline per unit time, together with the water-absorbing resin powder substance (R1=Wr1/Wa1). This air mass Wa1 does not include mass of the secondary air. For example, when mass Wr1 of the water-absorbing resin powder substance passed the start point Km of the transportation pipeline in 1 minute is 100 kg, and mass Wa1 of air passed the start point Km of the transportation pipeline in corresponding 1 minute is 10 kg, the initial solid-gas ratio R1 is calculated to be 100/10=10. The mass Wa1 of air can be calculated by determining air pressure and volume flow rate of air at each place, with various flow meters or mass flow meters and the like. In addition, linear velocity (initial linear velocity Vx) at the start point Km is calculated from the above determined mass Wa1 of air, pressure at the start point Km and cross-sectional area of the transportation pipeline at the start point Km.

A calculation method for terminal solid-gas ratio R2 is as follows. Terminal solid-gas ratio R2 is calculated by dividing mass Wr2 of the water-absorbing resin powder substance passed the terminal point Em of the transportation pipeline per unit time, with mass Wa2 of air passed the relevant terminal point Em of the transportation pipeline per unit time, together with the water-absorbing resin powder substance (R2=Wr2/Wa2). This air mass Wa2 is calculated by totaling mass of air passed the relevant start point Km of the transportation pipeline, and total mass of secondary air supplied between this start point Km and the terminal point Em. For example, when mass Wr2 of the water-absorbing resin powder substance passed the terminal point Em of the transportation pipeline in 1 minute is 100 kg, and mass Wa2 of air passed the terminal point Em of the transportation pipeline in 1 minute is 10 kg, the terminal solid-gas ratio R2 is calculated to be 100/10=10. This mass Wa2 of air can be calculated by determining air pressure and volume flow rate of air at each place, with various flow meters or mass flow meters and the like. In the present invention, it is set as R1>R2. In addition, linear velocity (terminal linear velocity Vy) at the terminal point Em is calculated from the above determined mass Wa2 of air, pressure at the terminal point Em and cross-sectional area of the transportation pipeline at the terminal point Em.

As described above, in the present invention, it is set to be R1>R2. In other words, the variation of solid-gas ratio (R1/R2) is set larger than 1. Supply of secondary air is controlled so that the variation of solid-gas ratio (R1/R2) becomes value of over 1. Specifically, for example, such control becomes possible by a method for providing a secondary pipeline for introducing secondary air, in the transportation pipeline for transporting the water-absorbing resin powder substance; or by installing a nozzle for introducing secondary air, at the midway of the transportation pipeline, and introducing secondary air therefrom; or the like. By control so that the variation of solid-gas ratio becomes larger than 1, initial linear velocity Vx can be suppressed, as well as obstruction phenomenon (clogging) can be suppressed. From this viewpoint, the variation of solid-gas ratio (R1/R2) is preferably equal to or larger than 1.8, preferably equal to or larger than 2, and more preferably equal to or larger than 3.6. Excessively large variation of the solid-gas ratio increases variation of transportation speed and tends to decrease performance of the water-absorbing resin powder substance. From this viewpoint, the variation of solid-gas ratio (R1/R2) is set equal to or smaller than 7, more preferably equal to or smaller than 6, and still more preferably equal to or smaller than 4.

In view of increasing conveyance efficiency, and suppressing property decrease caused by high initial linear velocity, the initial solid-gas ratio R1 is preferably equal to or higher than 35 (kg-resin/kg-air), more preferably equal to or higher than 50 (kg-resin/kg-air), and further preferably equal to or higher than 100 (kg-resin/kg-air). In view of suppressing decrease in conveyance efficiency (conveyed amount per unit hour), the initial solid-gas ratio R1 is preferably equal to or lower than 150 (kg-resin/kg-air), and more preferably equal to or lower than 120 (kg-resin/kg-air).

In view of increasing conveyance efficiency, suppressing collision of particles themselves in a floating state, and suppressing property decrease, the terminal solid-gas ratio R2 is preferably equal to or higher than 10 (kg-resin/kg-air), more preferably equal to or higher than 15 (kg-resin/kg-air), and more preferably equal to or higher than 20 (kg-resin/kg-air). In view of suppressing decrease in conveyance efficiency (conveyed amount per unit hour), and still more suppressing obstruction phenomenon or performance decrease, the terminal solid-gas ratio R2 is preferably equal to or lower than 50 (kg-resin/kg-air), more preferably equal to or lower than 40 (kg-resin/kg-air), and more preferably equal to or lower than 30 (kg-resin/kg-air).

In the present application, it is preferable that the total length Lt of the transportation pipelines contained in one transportation section is taken into consideration. In the embodiment shown in FIG. 2, one transportation section is connected by one transportation pipeline 34. In this case, the total length Lt is equal to length of the transportation pipeline 34. In the embodiment shown in FIG. 2, start point Km of the transportation pipeline coincides with start point B1 of the transportation section, and terminal point Em of the transportation pipeline coincides with terminal point F1 of the transportation section.

There may be the case where the total length Lt is not equal to length of the transportation pipeline 34. The embodiment shown in FIG. 5 is that example.

Figure 5:
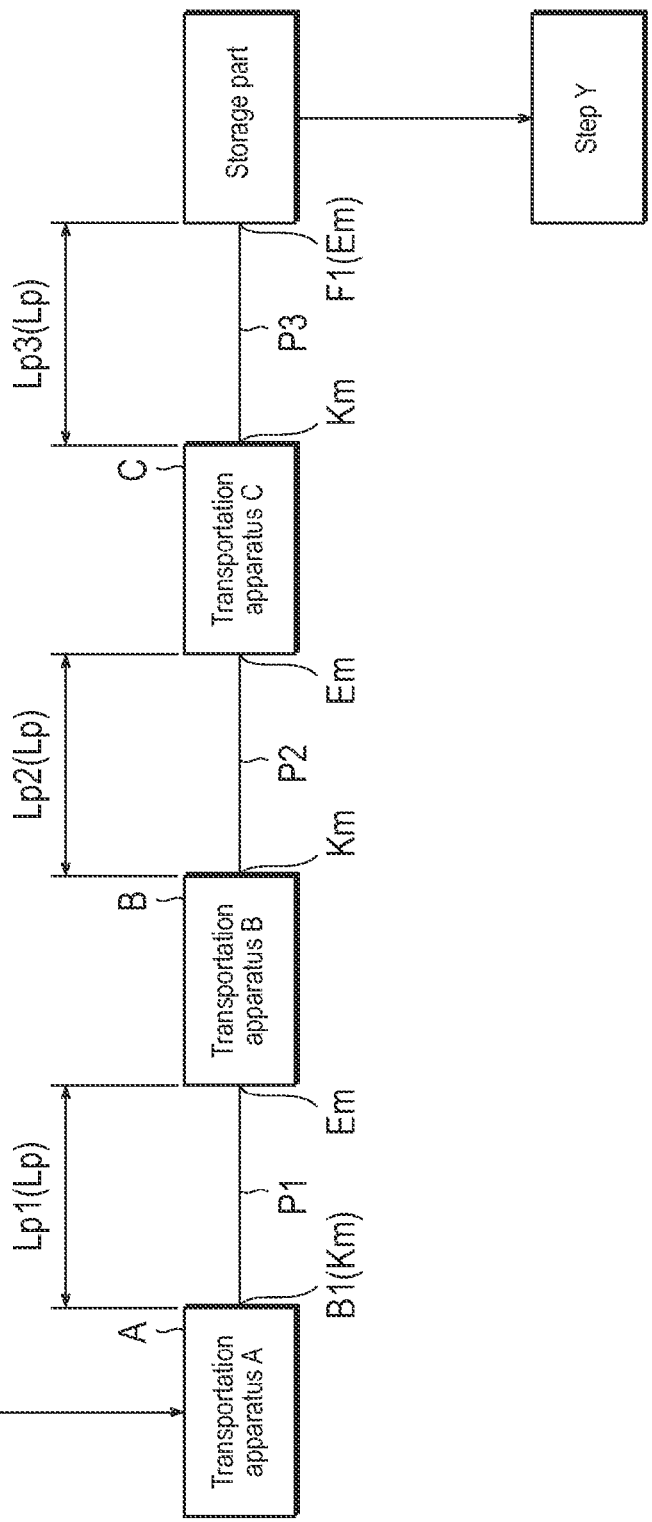
FIG. 5 is a drawing showing a schematic configuration of a transportation part to be used in the conveyance method of the present invention.

FIG. 5 is a drawing showing a schematic configuration of one embodiment of the conveyance method of the present invention. In this conveyance method, the water-absorbing resin powder substance obtained in the step X is transported to an apparatus performing the step Y. The step Y is the next step of the step X. The step X is not limited, and also the step Y is not limited.

In the embodiment shown in FIG. 5, three pneumatic transportation apparatuses (A, B and C) are used. Transportation of the water-absorbing resin powder substance starts from the transportation apparatus A and reaches a storage part via the transportation apparatus B and the transportation apparatus C. This storage part is a storage part for supplying the water-absorbing resin powder substance to an apparatus performing the step Y. This storage part is a part of an apparatus performing the step Y.

The transportation apparatus A and the transportation apparatus B are connected by a transportation pipeline P1. The transportation apparatus B and the transportation apparatus C are connected by a transportation pipeline P2. The transportation apparatus C and the storage part are connected by a transportation pipeline P3. That is, the transportation apparatus A, the transportation apparatus B and the transportation apparatus C are connected in series by the transportation pipelines. In this way, in the conveyance method for the water-absorbing resin powder substance of the present invention, two or more pneumatic transportation apparatuses are used in one transportation section, and the two or more pneumatic transportation apparatuses may be connected by the transportation pipelines in series.

Here, "one transportation section" is a continuous section for transporting the water-absorbing resin powder substance. In the embodiment shown in FIG. 5, the start point B1 of the transportation section is a connection point of the transportation apparatus A and the transportation pipeline P1, and the final point F1 of the transportation section is a connection point of the transportation pipeline P3 and the storage part. In this case, a section from the starting point B1 to the final point F1 is "one transportation section". Three transportation apparatuses are connected in series by the transportation pipelines P1, P2 and P3 between the starting point B1 and the final point F1. It should be noted that, other than installment linearly in a horizontal direction or in a vertical direction, there may be the case where the transportation pipeline is installed plane-likely, stereoscopically, or in curved polygon-likely, and in this case, curvature radius of the curved part is preferably set at equal to or larger than 2 m. Number of the curved part in one transportation section is preferably set at 2 to 10 places, and more preferably 2 to 5 places.

In addition, inner diameter of the pipeline is determined corresponding to production amount, however, it is preferably about 30 mm to 300 mm, still more preferably 50 mm to 200 mm, and particularly preferably 70 mm to 160 mm.

Figure 6:
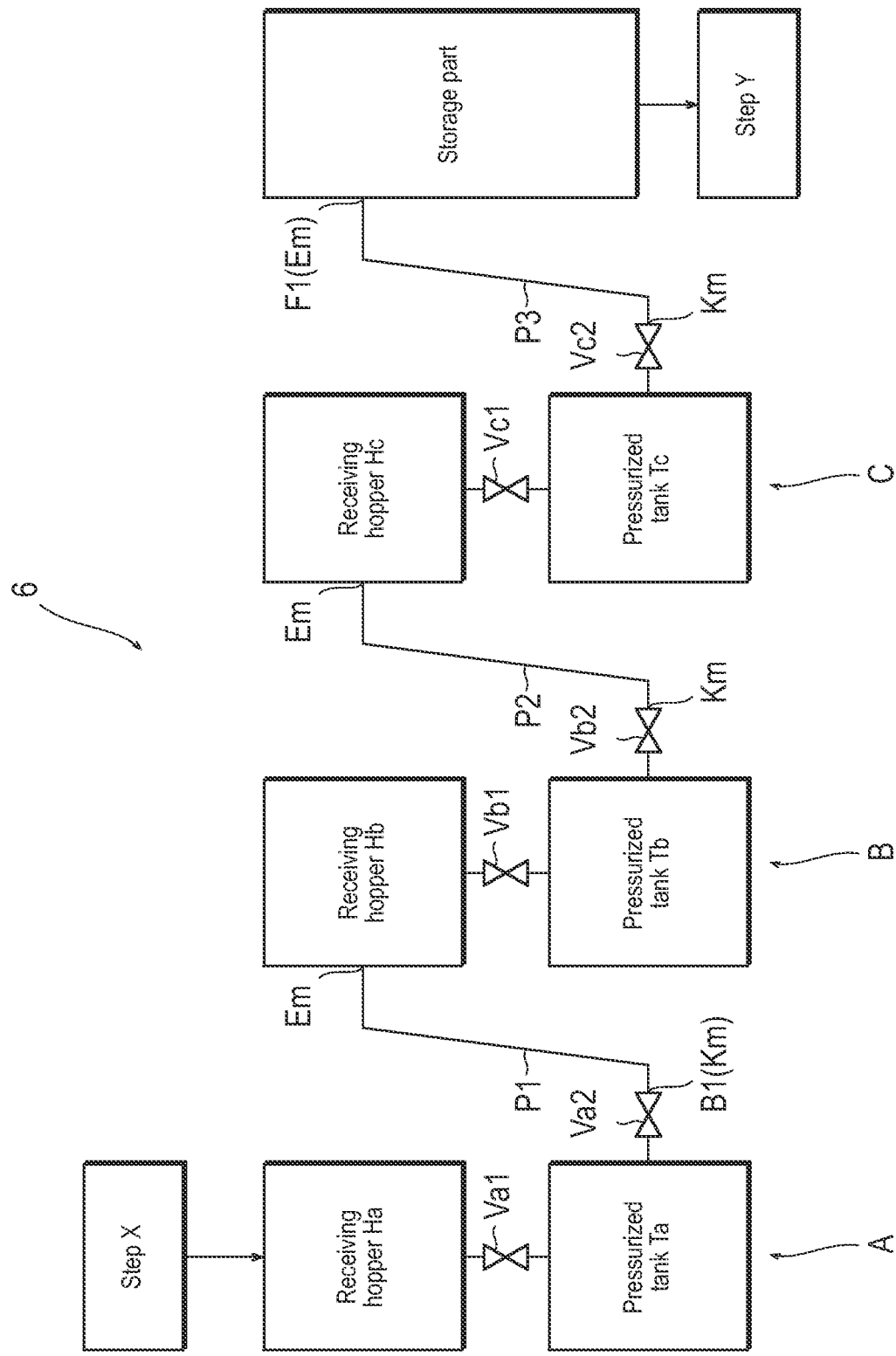
FIG. 6 is a schematic configuration view where

FIG. 6 is a schematic configuration view of the transportation part 6 shown in FIG. 5 somewhat in detail.

As shown in FIG. 6, the transportation apparatus A has a receiving hopper Ha, a pressurized tank Ta (pressurized tank hopper), and valves (Va1, Va2). The receiving hopper Ha and the pressurized tank Ta are connected via the valve Va1. The valve Va2 is installed between the pressurized tank Ta and the transportation pipeline P1.

The transportation apparatus B has a receiving hopper Hb, a pressurized tank Tb and valves (Vb1, Vb2). The receiving hopper Hb and the pressurized tank Tb are connected via the valve Vb1. The valve Vb2 is installed between the pressurized tank Tb and the transportation pipeline P2.

The transportation apparatus C has a receiving hopper Hc, a pressurized tank Tc and valves (Vc1, Vc2). The receiving hopper Hc and the pressurized tank Tc are connected via the valve Vc1. The valve Vc2 is installed between the pressurized tank Tc and the transportation pipeline P3.

Although not shown, to the pressurized tanks (Ta, Tb, Tc), a compressor is connected. By this compressor, the pressurized tanks (Ta, Tb, Tc) can be pressurized. Pressure inside the pressurized tanks (Ta, Tb, Tc) can be set higher than atmospheric pressure. In addition, although not shown, to the pressurized tanks (Ta, Tb, Tc), a depressurizing valve is installed. By opening the depressurizing valve, pressure inside the pressurized tanks (Ta, Tb, Tc) is decreased down to atmospheric pressure, so as to release a pressurized state. Pressure in the pressurized tanks (Ta, Tb, Tc) may be adjusted as appropriate.

It should be noted that, in the receiving hopper (Ha, Hb, Hc), there is preferably provided a filter for discharging transportation air introduced accompanying with reception of the water-absorbing resin powder substance, outside after purification, and this filter is preferably a bag filter.

The receiving hoppers (Ha, Hb, Hc) are arranged on the upper side of each of the pressurized tanks (Ta, Tb, Tc). When the valves (Va1, Vb1, Vc1) are opened, the water-absorbing resin powder substance present in each of the receiving hoppers (Ha, Hb, Hc) falls into the pressurized tanks (Ta, Tb, Tc). In this way, the water-absorbing resin powder substance is supplied to the pressurized tanks (Ta, Tb, Tc). It should be noted that in supplying the water-absorbing resin powder substance to the pressurized tanks (Ta, Tb, Tc), the pressurized tanks (Ta, Tb, Tc) are depressurized so as to release a pressurized state of the pressurized tanks (Ta, Tb, Tc).

In a conventional conveyance method, one transportation apparatus has been used per one transportation section. On the contrary, in the present embodiment, a plurality of (three) transportation apparatuses are used per one transportation section. In the present embodiment, in addition to the transportation apparatus A, the transportation apparatus B and the transportation apparatus C are connected in series and used.

Explanation will be given below on an action of each transportation apparatus sequentially.

Firstly, explanation will be given on transportation by the transportation apparatus A. The water-absorbing resin powder substance completed the step X is supplier to the receiving hopper Ha. In other words, the receiving hopper Ha receives the water-absorbing resin powder substance (a receiving step 1a). In the step 1a, the valve Va1 is closed. Then, the valve Va1 is opened to send the water-absorbing resin powder substance from the receiving hopper Ha to the pressurized tank Ta (a powder sending step 2a). In the step 2a, the valve Va2 is closed. In addition, in the step 2a, pressure in the pressurized tank Ta is the same as atmospheric pressure. Next, the valve Va1 and the valve Va2 are closed to pressurize in the pressurized tank Ta (a pressurization step 3a). By supplying air from a compressor (not shown), the pressurized tank Ta is pressurized. Next, the valve Va2 is opened to send the water-absorbing resin powder substance from the pressurized tank Ta to the receiving hopper Hb (a transportation step 4a). In the step 4a, by supplying air from a compressor (not shown), the pressurized tank Ta is pressurized, as well as transportation air is sent to the transportation pipeline P1. In the step 4a, the valve Va1 is closed.

Explanation will be given next on transportation by the transportation apparatus B. By the above-described transportation step 4a, the receiving hopper Hb receives the water-absorbing resin powder substance (a receiving step 1b). That is, the transportation step 4a described above and the receiving step 1b proceed at the same time. In the receiving step 1b, the valve Vb1 is closed. Then, the valve Vb1 is opened to send the water-absorbing resin powder substance from the receiving hopper Hb to the pressurized tank Tb (a powder sending step 2b). In the step 2b, the valve Vb2 is closed. In addition, in the step 2b, pressure in the pressurized tank Tb is the same as atmospheric pressure. Next, the valve Vb1 and the valve Vb2 are closed to pressurize in the pressurized tank Tb (a pressurization step 3b). By supplying air from a compressor (not shown), the pressurized tank Tb is pressurized. Next, the valve Vb2 is opened to send the water-absorbing resin powder substance from the pressurized tank Tb to the receiving hopper Hc (a transportation step 4b). In the step 4b, by supplying air from a compressor (not shown), the pressurized tank Tb is pressurized, as well as transportation air is sent to the transportation pipeline P2. In the step 4b, the valve Vb1 is closed.

Explanation will be given next on transportation by the transportation apparatus C. By the transportation step 4b, the receiving hopper Hc receives the water-absorbing resin powder substance (a receiving step 1c). That is, the transportation step 4b described above and the receiving step 1c proceed at the same time. In the receiving step 1c, the valve Vc1 is closed. Then, the valve Vc1 is opened to send the water-absorbing resin powder substance from the receiving hopper Hc to the pressurized tank Tc (a powder sending step 2c). In the step 2c, the valve Vc2 is closed. In addition, in the step 2c, pressure in the pressurized tank Tc is the same as atmospheric pressure. Next, the valve Vc1 and the valve Vc2 are closed to pressurize in the pressurized tank Tc (a pressurization step 3c). By supplying air from a compressor (not shown), the pressurized tank Tc is pressurized. Next, the valve Vc2 is opened to send the water-absorbing resin powder substance from the pressurized tank Tc to the storage part (a transportation step 4c). In the step 4c, by supplying air from a compressor (not shown), the pressurized tank Tc is pressurized, as well as transportation air is sent to the transportation pipeline P3. In the step 4c, the valve Vc1 is closed. It should be noted that pressure in the pressurized tank in a pressurized state is set at preferably 0.05 MPa to 0.7 MPa, and more preferably 0.1 MPa to 0.3 MPa.

The water-absorbing resin powder substance completed the step X moves sequentially along the transportation apparatus A, the transportation pipeline P1, the transportation apparatus B, the transportation pipeline P2, the transportation apparatus C, and the transportation pipeline P3 and reaches the storage part relevant to the step Y. By succeeding transportation by the transportation apparatus A, transportation by the transportation apparatus B, and transportation by the transportation apparatus C in series, transportation between the step X and the step Y is attained. In a conventional transportation, the transportation apparatus B and the transportation apparatus C were not installed.

Figure 7:
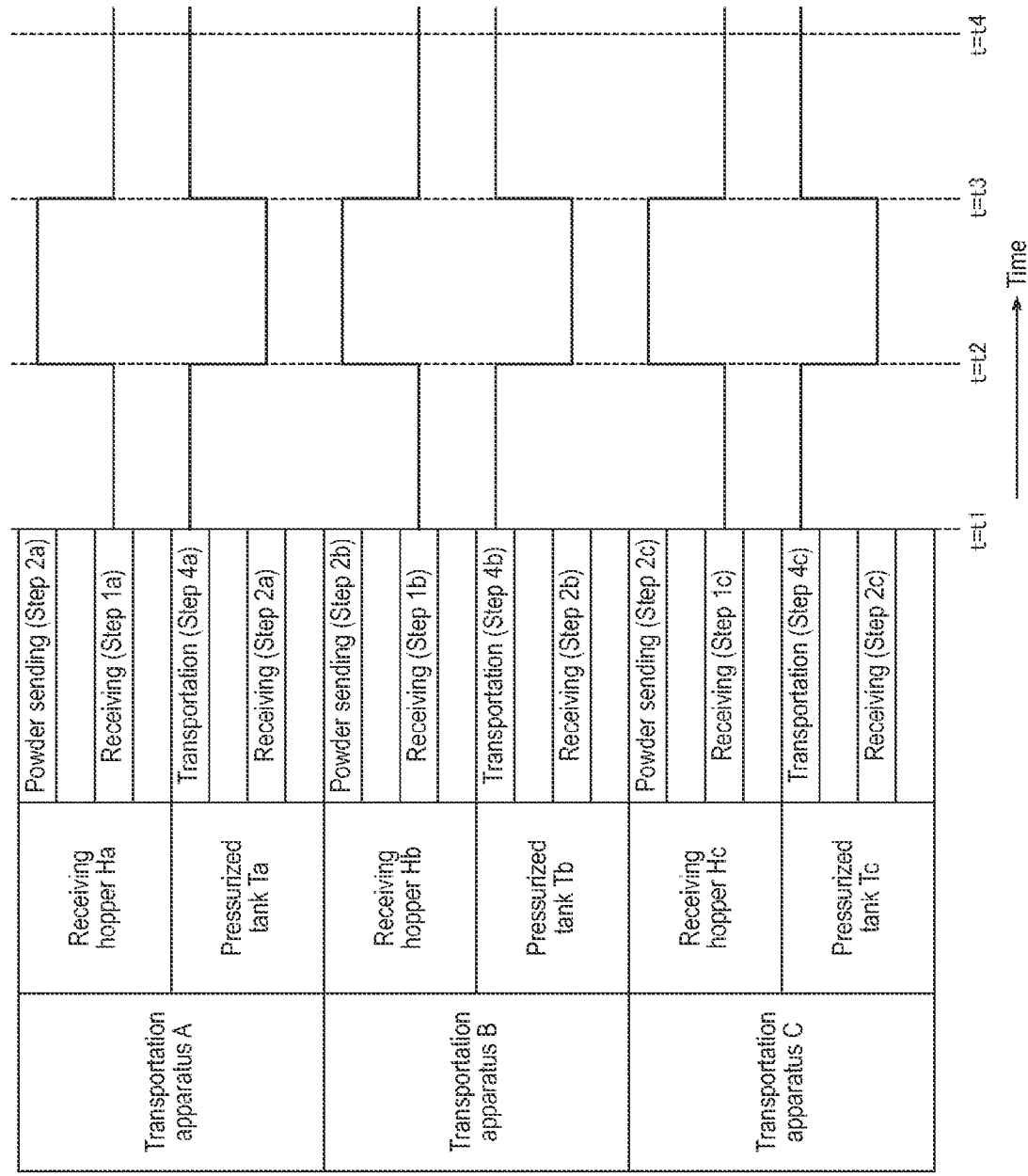
FIG. 7 is a drawing showing one example of a timing chart of each transportation apparatus relevant to the present invention.

FIG. 7 is a drawing showing an example of a timing chart of conveyance of the present embodiment. In this timing chart, time passes from the left side to the right side of the chart. For example, in the receiving hopper Ha, the receiving step 1a is performed within time t1 to time t2; the powder sending step 2a is performed within time t2 to time t3; and the receiving step 1a is performed within time t3 to time t4. In addition, for example, in the pressurized tank Ta, the transportation step 4a is performed within time t1 to time t2; the receiving step 2a is performed within time t2 to time t3; and the transportation step 4a is performed within time t3 to time t4.

Open-close timing of a valve correlates with timing of step switching. For example, in the transportation apparatus A, at time t2, the valve Va1 is switched from "close" to "open", and the valve Va2 is switched from "open" to "close". For example, in the transportation apparatus A, at time t3, the valve Va1 is switched from "open" to "close", and the valve Va2 is switched from "close" to "open".

In the timing chart shown in FIG. 7, timing of the step switching is coincident between the transportation apparatus A and the transportation apparatus B, and also timing of the step switching is coincident between the transportation apparatus B and the transportation apparatus C. Because work time of pipeline blowing or depressurization or the like is different in each of the transportation apparatuses A, B and C, it is difficult practically to match timing completely as in FIG. 7. In addition, in the timing chart of FIG. 7, time required for a pressurization step or the like is not taken into consideration. The timing chart of FIG. 7 is described simply aiming at showing that three transportation apparatuses are workable at the same time.

As shown in FIG. 7, the transportation steps by each transportation apparatus can proceed at the same time. In the present embodiment, the transportation step 4a, the transportation step 4b, and the transportation step 4c proceed at the same time. In this way, transportation by the transportation apparatus A, transportation by the transportation apparatus B, and transportation by the transportation apparatus C can be performed at the same time. By this proceeding of transportation at the same time, conveyance efficiency (conveyed amount per unit hour) can be enhanced.

The above-described problem of conveyance efficiency or property decrease or the like tends to become obvious in production in an industrial scale. From this point of view, in the conveyance method of the present invention, it is preferable that amount of the conveyed water-absorbing resin powder substance is equal to or higher than 1000 kg/hr. The unit [kg/hr] means amount (kg) conveyed per 1 hour. In view of decreasing the terminal linear velocity Vy, amount of the conveyed water-absorbing resin powder substance is preferably equal to or lower than 10000 kg/hr, and preferably equal to or lower than 8000 kg/hr.

As shown in FIG. 7, the receiving steps in each transportation apparatus also can proceed at the same time. In the present embodiment, the receiving step 1a to the receiving hopper Ha, the receiving step 1b to the receiving hopper Hb, and the receiving step 1c to the receiving hopper Hc may be performed at the same time. In addition, the receiving step 2a to the pressurized tank Ta, the receiving step 2b to the pressurized tank Tb, and the receiving step 2c to the pressurized tank Tc may be performed at the same time. By this proceeding at the same time, conveyance efficiency can be enhanced.

As shown in FIG. 7, in the same transportation apparatus, the receiving step by the receiving hopper, and the transportation step by the pressurized tank may be performed at the same time. For example, in the transportation apparatus A, the receiving step 1a and the transportation step 4a may be performed at the same time. By transferring the water-absorbing resin powder substance to the receiving hopper in advance by utilizing time of the transportation step by the pressurized tank, transfer to be performed later (transfer from the receiving hopper to the pressurized tank) can be performed smoothly.

In the present embodiment, there is restriction that in the same receiving hopper, the receiving step and the powder sending step cannot be performed at the same time. In addition, in the present embodiment, there is also restriction that in the same pressurized tank, the receiving step and the transportation step cannot be performed at the same time. Within a range of these restrictions, a plurality of transportation apparatuses can be actuated at the same time in parallel. It should be noted that when the above-mentioned valves (Va1, Va2, Vb1, Vb2, Vc1, Vc2) are changed to continuous supply-type valves such as rotary valve or the like, it is possible to eliminate the above restrictions. However, when the rotary valve is used, intermeshing generates at a rotation part of the rotary valve, which may generate fracture of the water-absorbing resin powder substance (particle fracture). In addition, in this case, pressurized pressure varies caused by air leakage at a rotary valve part, and transportation may become unstable. To avoid such particle fracture or unstable transportation, it is preferable to use an open-close-type valve, although it receives the restrictions described above.

It should be noted that, switching of the step can be performed by automatic control. This automatic control is performed, based on various automatic detection data. As this automatic detection data, for example, powder substance amount in the receiving hopper, powder substance amount in the pressurized tank (the pressurized tank hopper), pressure in the pressurized tank (the pressurized tank hopper) and the like are included. Detection of powder substance amount in the receiving hopper, or in the pressurized tank (the pressurized tank hopper) can be performed, for example, by detecting position of the upper surface of the powder substance (powder surface). The detection of this position of the powder surface can be performed by a known method such as an ultrasonic wave-type, a capacitance-type or the like. Based on these detection data, automatic control may be performed. Automatic control may be performed by a known method such as a sequencer or a computer or the like.

Preferably, based on detection result of the powder surface of the receiving hopper, open-close of the valves and actuation of the pneumatic transportation apparatuses are controlled automatically. For example, based on detection result that position of the powder surface of the receiving hopper Ha exceeds the predetermined upper limit value, control is performed so that the valve Va1 which has been closed is opened, the valve Va2 is closed and the transportation apparatus is stopped. On the contrary, for example, based on detection result that position of the powder surface of the receiving hopper Ha becomes below the predetermined lower limit value, control is performed so that the valve Va1 which has been opened is closed, the valve Va2 is opened and the transportation apparatus is actuated.

Preferably, based on detection result of pressure in the pressurized tank, open-close of the valve and actuation of the pneumatic transportation apparatus are controlled automatically. For example, based on detection result that the pressure in the pressurized tank Ta exceeds the predetermined upper limit value, control is performed so that the valve Va2 which has been closed is opened, and the transportation apparatus is actuated. On the contrary, for example, based on detection result that pressure in the pressurized tank Ta becomes below the predetermined lower limit value, control is performed so that the valve Va1 which has been closed is opened, the valve Va2 is closed and the transportation apparatus is stopped.

These automatic control programs may be determined in consideration of conveyance efficiency or the like.

It should be noted that, when the terminal solid-gas ratio is equal to or higher than 10 (kg-resin/kg-air), it is generally defined to be high-density pneumatic conveyance. In the present embodiment, three pneumatic transportation apparatuses are provided in one transportation section, and these pneumatic transportation apparatuses are connected in series by the transportation pipelines (P1, P2, P3). Because of this configuration, one transportation section is divided with a plurality of transportation apparatuses, transportation distance by a single transportation apparatus is reduced. For example, in the above embodiment, distance from the starting point B1 to the final point F1 of the transportation section is assumed to be 100 m. In this case, in a conventional system, the transportation pipeline of 100 m was necessary. On the contrary, in the above embodiment, for example, length of the transportation pipeline P1 can be set 33.3 m, length of the transportation pipeline P2 can be set 33.3 m, and length of the transportation pipeline P3 can be set 33.3 m. That is, transportation distance by a single transportation apparatus can be made shorter than distance of the transportation section.

Such a series connection of the pneumatic transportation apparatuses has high effectiveness when the transportation section is long. From this viewpoint, total length Lt of the transportation pipelines included in the one transportation section is preferably equal to or longer than 50 m, more preferably equal to or longer than 70 m, and more preferably equal to or longer than 100 m. In view of suppressing unit number of the transportation apparatus, the total length Lt is preferably equal to or shorter than 1000 m, more preferably equal to or shorter than 500 m, and more preferably equal to or shorter than 200 m. For example, in the embodiment shown in FIG. 5, this total length Lt is a sum of length Lp1 of the transportation pipeline P1, length Lp2 of the transportation pipeline P2, and length Lp3 of the transportation pipeline P3. That is, it can be expressed as follows.

$$Lt = Lp1 + Lp2 + Lp3 \quad \text{[Formula 1]}$$

In view of reducing the terminal linear velocity Vy and suppressing obstruction phenomenon, length Lp of each of the transportation pipelines included in the one transportation section is preferably equal to or shorter than 50 m, more preferably equal to or shorter than 40 m, and more preferably equal to or shorter than 35 m. In the case where unit number of the transportation apparatuses was increased excessively to shorten the length Lp, conveyance efficiency may decrease in some cases contrarily. From this viewpoint, the length Lp is preferably equal to or longer than 30 m. In the embodiment shown in FIG. 5, the length Lp1 of the transportation pipeline P1 is an example of the length Lp, the length Lp2 of the transportation pipeline P2 is also an example of the length Lp, and the length Lp3 of the transportation pipeline P3 is also an example of the length Lp.

In view of shortening of the length Lp, it is preferable that division of the transportation section by the transportation apparatuses is set equally. Therefore, when the unit number of the pneumatic transportation apparatuses connected in series in one transportation section is assumed to be N (N is an integer of equal to or larger than 2), it is preferable that the total length Lt in the transportation section and length Lp of all of the transportation pipelines contained in the transportation section satisfy the following relation (1), and more preferably satisfy the relation (2).

[Formula 2]

$$Lt/(N+1) \leq Lp \leq Lt/(N-1) \quad (1)$$

$$Lt/(N+0.5) \leq Lp \leq Lt/(N-0.5) \quad (2)$$

When transportation distance by a single transportation apparatus is long, high pressurization is required to increase conveyance efficiency while suppressing obstruction phenomenon (clogging). Caused by this high pressurization, linear velocity at the terminal of the transportation pipeline increases. The linear velocity indicates moving velocity of the water-absorbing resin powder substance, and substantially the same as moving velocity of air. Value of this linear velocity is measured along a longitudinal direction of the transportation pipeline. The linear velocity is calculated, for example, by measuring air flow amount flowing in the pipeline per unit time, with a flow meter or the like, and dividing this value with cross-sectional area of the transportation pipeline. As shown in FIG. 5 and FIG. 6, in the present embodiment, terminal Em of the transportation pipeline is present at 3 places.

In the present application, linear velocity of the water-absorbing resin powder substance at the starting point Km of the transportation pipeline is referred to also as the initial linear velocity Vx. In addition, pressure of air at the starting point Km of the transportation pipeline is referred to also as the initial pressure Px. In addition, linear velocity of the water-absorbing resin powder substance at the terminal Em of the transportation pipeline is referred to also as the terminal linear velocity Vy. In addition, pressure of air at the terminal Em of the transportation pipeline is referred to also as the terminal pressure Py.

In the same transportation pipeline, air pressure tends to decrease at the nearer position to the terminal Em of the transportation pipeline. In the same transportation pipeline, the terminal pressure Py is lower than the initial pressure Px. On the other hand, in the same transportation pipeline, the linear velocity tends to increase at the nearer position to the terminal Em of the transportation pipeline. In the same transportation pipeline, the terminal linear velocity Vy is higher than the initial linear velocity Vx. Usually, the terminal linear velocity Vy is the maximum linear velocity in the same transportation pipeline.

When the terminal linear velocity Vy decreases, collision speed of the particles and the transportation pipeline, or collision speed of the particles themselves decreases. That is, by the low terminal linear velocity Vy, damage which the water-absorbing resin powder substance receives can be suppressed. In view of suppressing property decrease of the water-absorbing resin powder substance, the terminal linear velocity Vy is preferably equal to or lower than 15 m/s, more preferably equal to or lower than 13 m/s and more preferably equal to or lower than 10 m/s. As described above, in the present invention, because transportation by a plurality of transportation apparatuses can proceed at the same time, decrease in the terminal linear velocity Vy and conveyance efficiency can be satisfied at the same time. In view of conveyance efficiency, the terminal linear velocity Vy is preferably equal to or higher than 7 m/s.

When the secondary air is used, it is preferable to adjust supply of the secondary air so that the terminal linear velocity Vy is within the preferable range described above.

As described above, high density pneumatic conveyance is performed at lower speed as compared with low density pneumatic conveyance. However, because the present invention is capable of performing transportation by a plurality of transportation apparatuses at the same time, conveyance efficiency can be enhanced under condition of low speed transportation. A preferable range of the terminal linear velocity Vy is a velocity range suitable for high density pneumatic conveyance.

The transportation section may have branched transportation routes. In this case, as for each of the branched transportation routes, the present invention can be satisfied. For example, the case where the transportation section is branched to two at a branching point D1 positioned at the middle between the starting point B1 and the final point of the transportation section is considered here. In this case, the final point F1 of the transportation section results in being present at two positions. When each of the final points F1 at these two positions are assumed to be the first final point F11 and the second final point F12, the following first route and the following second route may be recognized in this branched transportation section.

The first route: A route from the start point B1 of the transportation section to the first final point F11 via the branching point D1.

The second route: A route from the start point B1 of the transportation section to the second final point F12 via the branching point D1.

In this case, for example, when the transportation apparatuses are connected in series in the first route described above, the present invention can be satisfied. Similarly, when the transportation apparatuses are connected in series in the second route described above, the present invention can be satisfied. It should be noted that the branching point D1 may be formed by branching of the transportation pipeline, or may be formed by the transportation apparatus.

It is preferable that a filter which is capable of capturing the fine powders is installed at the receiving hopper. This filter is capable of capturing the fine powders present in gas in the receiving hopper. By making gas in the receiving hopper passed through the filter by suction under reduced pressure or the like, the fine powders can be captured. As this filter, a bag filter is preferable. By this filter, pneumatic conveyance can be performed while attaining reduction of the fine powders. As the filter, a membrane filter is preferable. This membrane filter is superior in trapping efficiency. In addition, because this membrane filter is capable of shaking off the fine powders easily, clogging seldom occurs, and trapping efficiency little decreases by use. As this filter, a filter superior in trapping efficiency for JIS 12-type carbon black (particle diameter: 0.03 μm to 0.2 μm) is preferable. In view of enabling to collect the fine powders efficiently, this trapping efficiency is preferably equal to or higher than 90%, more preferably equal to or higher than 95%, still more preferably equal to or higher than 99.9%, and particularly preferably equal to or higher than 99.99%. This trapping efficiency can be measured, for example, by a method of JIS B9908, type 1. In a simplified way, the trapping efficiency can be measured using a commercial dust meter. This trapping efficiency can be obtained substantially, based on an amount of the fine powders before passing through the filter, and the amount of the fine powders after passing through the filter. Specifically, from the amount of the fine powders before passing through the filter W0 (mg/m$^3$), and the amount of the fine powders after passing through the filter Wf (mg/m$^3$), the trapping efficiency can be calculated by using the following equation. It should be noted that, as this dust meter, for example, "P5L Digital Dust Meter (product name)", manufactured by Shibata Scientific Technology, Ltd. is included.

$$\text{Trapping efficiency (\%)} = (1 - Wf/W0) \times 100 \qquad \text{[Formula 3]}$$

As a material of the transportation pipeline, it is preferable to use stainless steel. The inner surface of the transportation pipeline is preferably mirror finished. By this mirror finish, damage which the water-absorbing resin powder substance receives can be suppressed. By mirror finishing of stainless steel, damage suppression effect is still more enhanced. As the stainless steel, SUS304, SUS316, SUS316L or the like is included. In addition, the mirror finish means smoothening to attain a surface roughness in accordance with JIS B 0601-1982 of equal to or smaller than 6.3 S. The "S" means the maximum value of maximum height (μm) of surface irregularity. Such a surface roughness can be measured with a stylus-type surface roughness meter (JIS B 0651) or a light wave interference-type surface roughness meter (JIS B 0652) or the like.

A method for controlling temperature of the water-absorbing resin powder substance during conveyance is not limited. Preferably, a means for heating the storage tank such as a hopper or the transportation pipeline from outside may be used. For example, by arranging a copper pipe at the exterior surface of storage tank and/or the transportation pipeline, and making steam passed inside the copper pipe, temperature of the water-absorbing resin powder substance can be maintained at equal to or higher than predetermined temperature. In addition, it is preferable that the transportation pipeline is not exposed outdoors. In view of controlling temperature of the water-absorbing resin powder substance during conveyance, it is preferable that the transportation pipeline is arranged indoors.

[Property of the Water-Absorbing Resin Powder Substance]
(Particle Shape)

Particle shape of the water-absorbing resin powder substance is not especially limited. As this particle shape, powders of spherical-shape, nearly spherical-shape, irregular and fractured shape (which is a pulverized substance), bar shape, polygonal shape, sausage shape (for example; refer to U.S. Pat. No. 4,973,632 specification), a particle with wrinkles (for example; refer to U.S. Pat. No. 5,744,564 specification) and the like are included. They may be primary particles (single particles), or granulated particles, or a mixture of the primary particles and the granulated particles. In addition, the particles may be foamed porous substances. Preferably, primary particles with irregular and fractured shape and/or granulated particles thereof are included.

(Particle Size)

Mass average particle diameter (D50) of the water-absorbing resin (water-absorbing resin powder substance) before surface cross-linking and/or in the final product is preferably 200 to 600 μm, more preferably 200 to 550 μm, still more preferably 250 to 500 μm, and particularly preferably 350 to 450 μm. In addition, the particle of below 150 μm is preferably as less as possible, and usually adjusted at 0 to 5% by mass, preferably 0 to 3% by mass, and particularly preferably 0 to 1% by mass. Still more, the particle of equal to or larger than 850 μm is preferably as less as possible, and usually adjusted at 0 to 5% by mass, preferably 0 to 3% by mass, and particularly preferably 0 to 1% by mass. Logarithm standard deviation (σζ) of particle size distribution is preferably set at 0.20 to 0.40, more preferably 0.27 to 0.37, and still more preferably 0.25 to 0.35. As for these measuring methods, as a method using a standard sieve, for example, it is described in WO 2004/069915 pamphlet or EDANA-ERT420.2-02.

It is preferable that absorbency against non-pressure (CRC) for a normal saline solution of the water-absorbing resin powder substance after surface cross-linking, and still more after conveyance is equal to or higher than 15 g/g. Absorbency against non-pressure (CRC) of the water-absorbing resin powder substance before surface cross-linking is not especially limited, however, it is preferably equal to or higher than 15 g/g. The absorbent articles such as disposable diapers, where this water-absorbing resin powder substance is used, absorb body fluid or the like well. From this viewpoint, absorbency (CRC) after surface cross-linking or before surface cross-linking is preferably equal to or higher than 20 g/g, still more preferably equal to or higher than 25 g/g, and particularly preferably equal to or higher than 30 g/g. In view of performance of the absorbent articles, the higher absorbency (CRC) is better. However, in the view point that the water-absorbing resin powder substance can be produced stably and obtained at low cost, the absorbency (CRC) is preferably equal to or lower than 60 g/g, still more preferably equal to or lower than 50 g/g, and particularly preferably equal to or lower than 35 g/g. It should be noted that in the present invention, absorbency against non-pressure (CRC) is synonymous as free swelling rate (GV), and CRC may be referred to as GV in some cases.

In measurement of absorbency against non-pressure (CRC), about 0.2 g of the water-absorbing resin powder substance is prepared. Firstly next, mass W1 of this water-absorbing resin powder substance is measured. This water-absorbing resin powder substance is put uniformly in a bag made of nonwoven fabric (60 mm×85 mm). This bag is immersed in a normal saline solution with a temperature adjusted at 25±2° C., for 30 minutes. Next, this bag is pulled up, and put into a centrifugal separation apparatus (a compact-type centrifugal separation apparatus, model-type: H-122, manufactured by Kokusan Co., Ltd.). This centrifugal separation apparatus is operated under condition of 250 G (250×9.81 m/s²) for 3 minutes. Mass W2 (g) of the bag thereafter is measured. On the other hand, similar processing is performed on the bag not containing the water-absorbing resin powder substance, and mass W3 (g) thereof is measured. Absorbency against non-pressure (CRC) is calculated according to the following equation.

$$CRC\ (g/g)=[(W2-W3)/W1]-1 \qquad [\text{Formula 4}]$$

Absorbency against pressure (AAP) for a normal saline solution under pressure (ERT420.2-02, under condition of a load of 50 g/cm²) of the water-absorbing resin powder substance after surface cross-linking, and still more after conveyance is preferably 15 to 50 g/g, more preferably 18 to 45 g/g, particularly preferably 20 to 45 g/g, and most preferably 20 to 45 g/g. The absorbent articles such as disposable diapers, where this water-absorbing resin powder substance is used, absorb body fluid or the like well. It should be noted that absorbency against pressure (AAP) is absorbency (unit: g/g) after swelling under a load of 21 g/cm², for 1 hour for a 0.9% aqueous solution of sodium chloride. It should be noted that, hereafter in Examples of the present application, "AAP" is defined as a value measured similarly except that the load is changed to 50 g/cm².

Saline flow conductivity (hereafter also referred to as SFC), for the 0.69% by mass normal saline aqueous solution, of the water-absorbing resin powder substance is a value showing liquid permeation in swelling of the water-absorbing resin powder substance or the water-absorbing agent. The larger SFC value shows that the water-absorbing resin powder substance has the higher liquid permeation. SFC of the water-absorbing resin powder substance (a surface cross-linked polyacrylic acid (salt)-based water-absorbing resin powder substance) is preferably equal to or larger than 10 ($\times 10^{-7} \cdot \text{cm}^3 \cdot \text{s} \cdot \text{g}^{-1}$), more preferably 20 to 1000 ($\times 10^{-7} \cdot \text{cm}^3 \cdot \text{s} \cdot \text{g}^{-1}$), and still more preferably 30 to 500 ($\times 10^{-7} \cdot \text{cm}^3 \cdot \text{s} \cdot \text{g}^{-1}$). In the present invention, because the initial linear velocity Vx can be suppressed, decrease in SFC during conveyance can be suppressed. Such an evaluation is performed in accordance with the SFC test described in U.S. Pat. No. 5,849,405 specification.

It should be noted that, in general, AAP, CRC and SFC tend to be contradictory, however, by adopting the above range, the water-absorbing resin having these properties balanced can be provided.

Moisture content (defined by reduced amount by drying in heating 1 g at 180° C. for 3 hours) of the water-absorbing resin powder substance before and after conveyance is preferably equal to or lower than 5% by weight, more preferably equal to or lower than 3% by weight. This definition is applicable similarly to any of the cases that the water-absorbing resin powder substance is the water-absorbing resin before surface cross-linking and the particulate water-absorbing resin after surface cross-linking. Certain amount of water, preferably equal to or more than 0.1% by weight, more preferably equal to or more than 0.5% by weight, is advantageous in that absorbing speed or property after conveyance can be maintained or enhanced. Adjustment of the moisture content may be performed as appropriate by adjusting heating condition or the addition amount of water as needed.

In the conveyance method of the present invention, in the view point that superior property of the water-absorbing resin powder substance can be maintained stably and obstruction phenomenon can be suppressed, it is preferable that dried gas is used as the gas forming the air flow. Dew point of the gas is preferably equal to or lower than −10° C., more preferably equal to or lower than −15° C., and particularly preferably equal to or lower than −20° C. Other than use of the dried gas, heated gas may be used. A heating method is not especially limited; the gas may be heated directly using a heat source, or the gas may be heated indirectly by heating the transportation part or the pipeline in which the gas passes. Temperature of the heated gas is preferably equal to or higher than 30° C., more preferably equal to or higher than 50° C., and still more preferably equal to or higher than 70° C.

Pneumatic conveyance of the present invention may be conveyance in a pressurized state or conveyance in a reduced pressure state. In the case of conveyance in a reduced pressure state, the water-absorbing resin powder substance is conveyed by suction force of the transportation apparatus. In this case, inside pressure of the pipeline is set lower than atmospheric pressure. Preferably, pneumatic conveyance of the present invention is conveyance in a pressurized state as in the embodiment described above. In the case of conveyance in a pressurized state, the water-absorbing resin powder substance is conveyed by high pressure generating from the transportation apparatus. The embodiment described above is conveyance in a pressurized state. In conveyance in a pressurized state, inside pressure of the pipeline is set higher than atmospheric pressure. By performing the pressurized state, it becomes difficult for dust or the like to intrude inside the transportation apparatuses or the pipelines. The conveyance in a pressurized state can contribute to reduction of foreign substances contained in the water-absorbing resin powder substance. Reduction of the foreign substances is capable of contributing to property enhancement of the water-absorbing resin powder substance.

EXAMPLES

Effect of the present invention will be clarified below with reference to Examples, however, the present invention should not be construed restrictive, based on description of these Examples. It should be noted that in this specification, "parts by mass" and "% by mass" are synonymous to "parts by weight" and "% by weight", respectively. In addition, a measurement method for SFC hereafter is as described above.

Preparation Example 1 of the Water-Absorbing Resin Powder Substance

The water-absorbing resin powder substance was produced continuously using a continuous production apparatus (a production capacity of about 1500 kg per one hour) of the water-absorbing resin, in which the polymerization step (static polymerization on a belt), the gel grain refining (crushing) step, the drying step, the pulverization step, the classification step, the surface cross-linking step (a spray step of the surface cross-linking agent and a heating step), the cooling step, the granule sizing step, and the transportation step between each step are connected, and which is capable of performing each step continuously.

Firstly, as a monomer aqueous solution (1), a solution containing a partial sodium salt of acrylic acid with 75% by mole neutralized was prepared. The monomer aqueous solution (1) contains polyethylene glycol diacrylate (average number of n=9), as an inner cross-linking agent, and content of the polyethylene glycol diacrylate was adjusted to 0.06% by mole, relative to total mole number of the monomer. In the monomer aqueous solution (1) described above, concentration of the monomer (the partial sodium salt of acrylic acid) was set to 38% by mass. The resultant monomer aqueous solution (1) was fed continuously with a metering pump, and by blowing nitrogen gas continuously in the midway of the pipeline, oxygen concentration of this monomer aqueous solution (1) was adjusted to equal to or lower than 0.5 ppm. It should be noted that, the "average number of n" means average number of polymerization degree of ethylene oxide in the polyethylene glycol chain.

Next, to the monomer aqueous solution (1), sodium persulfate and L-ascorbic acid were mixed continuously with a line mixer. In this line mixing, ratio of mixing of sodium persulfate was set to 0.12 g, relative to 1 mole of the monomer, and ratio of mixing of L-ascorbic acid was set to 0.005 g, relative to 1 mole of the monomer. The continuous mixture obtained by this line mixing was supplied to a flat surface steel belt having weirs at both sides thereof, so that thickness thereof became about 30 mm to perform static aqueous solution polymerization continuously for 30 minutes to obtain a water-containing gel-like cross-linked polymer (1). This water-containing gel-like cross-linked polymer (1) was segmentalized to a particle diameter of about 2 mm using a meat chopper with a pore diameter of 7 mm, and this was spread and mounted on a moving porous plate of a continuous air-flow band dryer to a thickness of 50 mm, to be subjected to drying at 185° C. for 30 minutes, to obtain a dried polymer. Whole mass of the relevant dried polymer was continuously supplied to a three-stage roll mill to be pulverized. Roll gap configuration of this three-stage roll mill was from the top, 1.0 mm/0.55 mm/0.42 mm. After this pulverization, it was classified by a classification apparatus having a metal mesh with a sieve mesh size of 850 μm, and a metal mesh with a sieve mesh size of 150 μm to obtain the water-absorbing resin powder substrate (the particulate water-absorbing resin) (1), wherein the ratio of the particles with 850 μm to 150 μm was about 98% by mass, and the ratio of the particles smaller than 150 μm was about 2% by mass. CRC of this water-absorbing resin powder substrate (1) was 35 g/g.

Further, this water-absorbing resin powder substrate (1) was continuously supplied in 1500 kg/hr to a high speed continuous mixing machine (Turbulizer/1000 rpm), while the surface treatment agent solution was mixed by spraying with a sprayer. The surface treatment agent solution was a mixed solution of 1,4-butanediol, propylene glycol and pure water. Specifically, this surface treatment agent solution was a mixed solution containing 0.3 part by mass of 1,4-butanediol, 0.5 part by mass of propylene glycol and 2.7 part by mass of pure water, relative to 100 parts by mass of the water-absorbing resin. Next, after the resultant mixture was subjected to heat processing continuously at 198° C. for 40 minutes with a paddle dryer, it was subjected to forced cooling down to 60° C. using a similar paddle dryer (the cooling step). Further, a substance passed 850 μm was classified using a sieving apparatus, and a product on the mesh (a substance not passed 850 μm) was pulverized again and mixed with the substance passed 850 μm, to obtain the water-absorbing resin power substance A as a granule sized product, in which the whole amount was the substance passed 850 μm. It should be noted that the water-absorbing resin power substance A had a CRC of 30.5 (g/g), an SFC of 30.0 ($\times 10^{-7} \cdot cm^3 \cdot s \cdot g^{-1}$), and an AAP of 25.2 (g/g).

Preparation Example 2 of the Water-Absorbing Resin Powder Substance

The water-absorbing resin powder substance B was obtained similarly as in Preparation Example 1, except that 1% by mass of a 50% by mass aqueous solution of aluminum sulfate was added relative to 100 parts by mass of the water-absorbing resin powder substance (1), in the cooling step described above. It should be noted that the water-absorbing resin powder substance B had a CRC of 30.0 (g/g), an SFC of 50.0 ($\times 10^{-7} \cdot cm^3 \cdot s \cdot g^{-1}$), and an AAP of 24.3 (g/g).

Preparation Example 3 of the Water-Absorbing Resin Powder Substance

The water-absorbing resin powder substance (particulate water-absorbing resin) (3) having nearly the same particle size as in Preparation Example 1, and a CRC of 35 g/g, was obtained by performing similarly as in Preparation Example 1, except that recycling of the fine powders was performed by kneading about 8% by weight of the fine powders removed (substances passed through 150 μm) together with a water-containing gel-like cross-linked polymer (2), with a meat chopper, in accordance with JP-A-2001-079829, after pulverization with a three-stage roll mill and classifying to 850 to 150 μm. By observation with an electron microscope, the water-absorbing resin powder substance (3) was found to include a granulated substance, in which the fine powders are unified to particles with a particle diameter of 850 to 150 μm, and thus yield and water-absorbing speed (for example, Vortex or FSR: as for a measurement method, refer to U.S. Pat. No. 6,849,665 specification) were enhanced due to recycling of the fine powders, as compared with the water-absorbing resin powder substance (1). It should be noted that, the recycling of the fine powders to similar water-containing gel is possible also by a continuous kneader instead of the meat chopper.

Example 1a

A transportation test of the water-absorbing resin powder substance was performed using a transportation apparatus similar to the pneumatic transportation apparatus 30 shown in FIG. 2. Testing time was 600 seconds. As the water-absorbing resin powder substance, the water-absorbing resin A obtained in Preparation Example 1 was used. Inner diameter of the transportation pipeline was set at 83.1 mm. Each transportation pipeline 34 has a horizontal part and a vertical part. Length of the transportation pipeline 34 was 104 m for the horizontal part, and 19 m for the vertical part. Therefore, length Lp of the transportation pipeline and the total length Lt was 123 m. Initial linear velocity Vx was 2 m/s and terminal linear velocity Vy was 11.5 m/s. In addition, the initial solid-gas ratio R1 was 50.2 (kg-resin/kg-air) and the terminal solid-gas ratio R2 was 28.7 (kg-resin/kg-air). Conveyed amount per unit hour was 4707 kg/hr.

The water-absorbing resin powder substance after the transportation test, which reached the final point F1 of the transportation section, had a CRC of 30.5 (g/g), an SFC of 29.8 ($\times 10^{-7} \cdot cm^3 \cdot s \cdot g^{-1}$), and an AAP of 25.2 (g/g). A reduction rate $R_s$ of SFC by conveyance was 0.7%. Obstruction phenomenon of the transportation pipeline 34 was not observed. It should be noted that, when SFC before conveyance and SFC after conveyance are expressed as Sf1 (g/g) and Sf2 (g/g), respectively, the reduction rate Rs of SFC can be calculated by the following formula.

$$Rs = [(Sf1 - Sf2)/Sf1] \times 100 \qquad \text{[Formula 5]}$$

Example 2a

The transportation test was performed similarly as in the above-described Example 1a, except that the initial solid-gas ratio R1, the terminal solid-gas ratio R2, the initial linear velocity Vx and the terminal linear velocity Vy were set as values shown in Table 1.

The water-absorbing resin powder substance after the transportation test, which reached the final point F1 of the transportation section, had property of a CRC of 30.5 (g/g), an SFC of 29.9 ($\times 10^{-7} \cdot cm^3 \cdot s \cdot g^{-1}$), and an AAP of 25.3 (g/g). The reduction rate Rs of SFC by transportation was 0.3%. Obstruction phenomenon of the transportation pipeline 34 was not observed. Specifications and evaluation results of this Example are shown in the following Table 1.

Example 3a

The transportation test was performed similarly as in the above-described Example 1a, except that the initial solid-gas ratio R1, the terminal solid-gas ratio R2, the initial linear velocity Vx and the terminal linear velocity Vy were set as values shown in Table 1.

The water-absorbing resin powder substance after the transportation test, which reached the final point F1 of the transportation section, had a property of a CRC of 30.4 (g/g), an SFC of 29.7 ($\times 10^{-7} \cdot cm^3 \cdot s \cdot g^{-1}$), an AAP of 25.1 (g/g). A reduction rate Rs of SFC by transportation was 1.0%. Obstruction phenomenon of the transportation pipeline 34 was not observed. Specifications and evaluation results of this Example are shown in the following Table 1.

Comparative Example 1a

The transportation test was performed similarly as in the above-described Example 1a, except that the initial solid-gas ratio R1, the terminal solid-gas ratio R2, the initial linear velocity Vx and the terminal linear velocity Vy were set as values shown in Table 1. In this Comparative Example 1a, pressure of secondary air was adjusted so that the variation of solid-gas ratio (R1/R2) became 9.7.

The water-absorbing resin powder substance after the transportation test, which reached the final point F1 of the transportation section, had a property of a CRC of 30.3 (g/g), an SFC of 26.8 ($\times 10^{-7} \cdot cm^3 \cdot s \cdot g^{-1}$), and an AAP of 24.9 (g/g).

A reduction rate Rs of SFC by transportation was 10.7%. Obstruction phenomenon of the transportation pipeline 34 was not observed. Specifications and evaluation results of this Comparative Example are shown in the following Table 1.

Comparative Example 2a

The transportation test was performed similarly as in the above-described Example 1a, except that secondary air was not used, and the initial solid-gas ratio R1, the terminal solid-gas ratio R2, the initial linear velocity Vx and the terminal linear velocity Vy were set as values shown in Table 1. In this Comparative Example 2a, the variation of solid-gas ratio (R1/R2) was 1.0. In this Comparative Example 2a, Obstruction phenomenon (clogging) of the transportation pipeline 34 generated, and thus the transportation test was stopped. Specifications and evaluation results of this Comparative Example are shown in the following Table 1.

Example 1b

The transportation test was performed using the water-absorbing resin powder substance B instead of the water-absorbing resin powder substance A. Still more, the initial solid-gas ratio R1, the terminal solid-gas ratio R2, the initial linear velocity Vx and the terminal linear velocity Vy were set as values shown in Table 1.

The water-absorbing resin powder substance after the transportation test, which reached the final point F1 of the transportation section, had a property of a CRC of 30.0 (g/g), an SFC of 49.5 ($\times 10^{-7} \cdot cm^3 \cdot s \cdot g^{-1}$), and an AAP of 24.3 (g/g). A reduction rate Rs of SFC by transportation was 1.0%. Obstruction phenomenon of the transportation pipeline 34 was not observed. Specifications and evaluation results of this Example are shown in the following Table 1.

Example 2b

A transportation test was performed using the water-absorbing resin powder substance B instead of the water-absorbing resin powder substance A. Still more, the initial solid-gas ratio R1, the terminal solid-gas ratio R2, the initial linear velocity Vx and the terminal linear velocity Vy were set as values shown in Table 1. On other conditions, the transportation test was performed similarly as in the above-described Example 1a.

The water-absorbing resin powder substance after the transportation test, which reached the final point F1 of the transportation section, had a property of a CRC of 29.9 (g/g), an SFC of 49.3 ($\times 10^{-7} \cdot cm^3 \cdot s \cdot g^{-1}$), and an AAP of 24.3 (g/g). A reduction rate Rs of SFC by transportation was 1.4%. Obstruction phenomenon of the transportation pipeline 34 was not observed. Specifications and evaluation results of this Example are shown in the following Table 1.

Comparative Example 1b

The transportation test was performed similarly as in the above-described Example 1b, except that the initial solid-gas ratio R1, the terminal solid-gas ratio R2, the initial linear velocity Vx and the terminal linear velocity Vy were set as values shown in Table 1. In this Comparative Example 1b, pressure of secondary air was adjusted so that the variation of solid-gas ratio (R1/R2) became 10.3.

The water-absorbing resin powder substance after the transportation test, which reached the final point F1 of the transportation section, had a property of a CRC of 29.8 (g/g), an SFC of 42.5 ($\times 10^{-7} \cdot cm^3 \cdot s \cdot g^{-1}$), and an AAP of 23.9 (g/g). A reduction rate Rs of SFC by transportation was 15%. Obstruction phenomenon of the transportation pipeline 34 was not observed. Specifications and evaluation results of this Comparative Example are shown in the following Table 1.

Comparative Example 2b

The transportation test was performed similarly as in the above-described Example 1b, except that secondary air was not used, and the initial solid-gas ratio R1, the terminal solid-gas ratio R2, the initial linear velocity Vx and the terminal linear velocity Vy were set as values shown in Table 1. In this Comparative Example 2b, the variation of solid-gas ratio (R1/R2) was 1.0. In this Comparative Example 2b, obstruction phenomenon (clogging) of the transportation pipeline 34 generated, and thus the transportation test was stopped. Specifications and evaluation results of this Comparative Example are shown in the following Table 1.

Comparative Example 1c

The transportation test was performed using the water-absorbing resin powder substance (3) containing a fine-powder recycled product instead of the water-absorbing resin powder substance A, in Comparative Example 1b. As a result, regeneration of the fine powders and generation of powder dust were observed.

TABLE 1

|  | Expample 1a | Expample 2a | Expample 3a | Expample 1b | Expample 2b | Comparative Example. 1a | Comparative Example. 2a | Comparative Example. 1b | Comparative Example. 2b |
| --- | --- | --- | --- | --- | --- | --- | --- | --- | --- |
| Water-absorbing resin power substance | A | A | A | B | B | A | A | B | B |
| Length of transportation pipeline Lp (m) | 123 | 123 | 123 | 123 | 123 | 123 | 123 | 123 | 123 |
| Initial solid-gas ratio R1 (kg-resin/kg-air) | 50.2 | 108 | 147.3 | 99.9 | 141 | 157.8 | 30.6 | 152.7 | 26.9 |
| Terminal solid-gas ratio R2 (kg-resin/kg-air) | 28.7 | 30.1 | 21 | 27.9 | 20.1 | 16.3 | 30.6 | 14.8 | 26.9 |
| Variation of solid-gas ratio (R1/R2) | 1.8 | 3.6 | 7.0 | 3.6 | 7.0 | 9.7 | 1.0 | 10.3 | 1.0 |
| Initial linear velocity Vx(m/s) | 2 | 0.86 | 0.78 | 0.86 | 0.78 | 0.76 | 1.7 | 0.71 | 1.7 |
| Terminal linear velocity Vy (m/s) | 11.5 | 10.1 | 11.5 | 10.1 | 11.5 | 23.9 | 9.9 | 23.7 | 9.9 |
| Conveyed amount per unit hour (kg/hr) | 4707 | 4453 | 3855 | 4239 | 3742 | 5185 | obstruction | 4887 | obstruction |

TABLE 1-continued

|  | Expample 1a | Expample 2a | Expample 3a | Expample 1b | Expample 2b | Comparative Example. 1a | Comparative Example. 2a | Comparative Example. 1b | Comparative Example. 2b |
| --- | --- | --- | --- | --- | --- | --- | --- | --- | --- |
| SFC after conveyance (g/g) | 29.8 | 29.9 | 29.7 | 49.5 | 49.3 | 26.8 | — | 42.5 | — |
| Decrease rate of SFC (%) | 0.7 | 0.3 | 1.0 | 1.0 | 1.4 | 10.7 | — | 15.0 | — |

As is shown in Table 1, Examples have high evaluation as compared with Comparative Examples. From these results, superiority of the present invention is obvious.

INDUSTRIAL APPLICABILITY

The conveyance method for a water-absorbing resin powder substance relevant to the present invention can be applied suitably in the production step of the water-absorbing resin powder substance utilized in hygiene materials containing absorbing bodies such as, for example, disposable diapers, sanitary napkins, incontinent pads and the like.

The invention claimed is:

1. A conveyance method for a water-absorbing resin powder substance, the method comprising a step of pneumatically transporting the water-absorbing resin powder substance during production thereof via a transportation pipeline, wherein R1/R2 exceeds 1 and is equal to or lower than 7, in which R1 (kg-resin/kg-air) stands for a solid-gas ratio at the point where the resin powder substance enters the transportation pipeline, R1 is 35 to 150 (kg-resin/kg-air), R2 (kg-resin/kg-air) stands for a solid-gas ratio at the point where the resin powder substance exits the transportation pipeline, and R2 is 20 to 50 (kg-resin/kg-air), wherein values of R1/R2 are manipulated by introducing secondary air.

2. The conveyance method according to claim 1, wherein a linear velocity of the water-absorbing resin powder substance at the start point of the transportation pipeline (initial linear velocity) is equal to or lower than 7 m/s.

3. The conveyance method according to claim 1, wherein at least a part of the transportation pipeline is kept heated at a temperature equal to or higher than 50° C. by heating from outside.

4. The conveyance method according to claim 1, wherein a production apparatus performing the production step comprises a storage part, and the storage part is kept heated at a temperature equal to or higher than 50° C. by heating from outside.

5. The conveyance method according to claim 4, wherein the water-absorbing resin powder substance pneumatically conveyed is stored in the storage part.

6. The conveyance method according to claim 1, wherein total length Lt of the transportation pipeline included in one transportation section is equal to or larger than 50 m.

7. The conveyance method according to claim 1, wherein the pneumatic conveyance is high density pneumatic conveyance.

8. The conveyance method according to claim 1, wherein amount of the conveyed water-absorbing resin powder substance is equal to or higher than 1000 kg/hr.

9. The conveyance method according to claim 1, wherein the water-absorbing resin powder substance is surface cross-linked with a polyhydric alcohol.

10. The conveyance method according to claim 1, wherein the water-absorbing resin powder substance comprises a polyvalent metal salt.

11. The conveyance method according to claim 1, wherein the water-absorbing resin powder substance comprises an inorganic particle.

12. The conveyance method according to claim 1, wherein a saline flow conductivity (SFC) for 0.69% by mass normal saline solution of the water-absorbing resin powder substance after conveyance is equal to or larger than 10 ($\times 10^{-7} \cdot cm^3 \cdot s \cdot g^{-1}$).

13. The conveyance method according to claim 1, wherein the water-absorbing resin powder substance is a polyacrylic acid (salt)-based water-absorbing resin with an irregular and fractured shape, obtained by continuous belt polymerization or continuous kneader polymerization.

14. The conveyance method according to claim 1, wherein the water-absorbing resin powder substance is a polyacrylic acid (salt)-based water-absorbing resin obtained by a production step comprising a fine-powder recycling step.

15. The conveyance method according to claim 1, wherein the water-absorbing resin powder substance is a polyacrylic acid (salt)-based water-absorbing resin formed by surface cross-linking at 150 to 250° C.

* * * * *